US012005714B2

(12) United States Patent
Ono et al.

(10) Patent No.: US 12,005,714 B2
(45) Date of Patent: Jun. 11, 2024

(54) SYSTEM INCLUDING A RESERVOIR CONFIGURED TO STORE LIQUID AND A TANK TO WHICH THE RESERVOIR CAN BE CONNECTED

(71) Applicant: BROTHER KOGYO KABUSHIKI KAISHA, Nagoya (JP)

(72) Inventors: Akihito Ono, Nagoya (JP); Akinari Ishibe, Okazaki (JP); Hiroaki Takahashi, Nagoya (JP); Takahiro Miyao, Nisshin (JP); Kosuke Nukui, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/149,298

(22) Filed: Jan. 3, 2023

(65) Prior Publication Data

US 2023/0286278 A1 Sep. 14, 2023

Related U.S. Application Data

(63) Continuation of application No. 17/325,352, filed on May 20, 2021, now Pat. No. 11,584,130, which is a (Continued)

(30) Foreign Application Priority Data

Jan. 17, 2019 (JP) ................................. 2019-005744
Jan. 17, 2019 (JP) ................................. 2019-005745

(51) Int. Cl.
*B41J 2/175* (2006.01)
*B41J 29/13* (2006.01)

(52) U.S. Cl.
CPC ........... *B41J 2/175* (2013.01); *B41J 2/17503* (2013.01); *B41J 2/17509* (2013.01);

(Continued)

(58) Field of Classification Search
CPC .... B41J 2/175; B41J 2/17503; B41J 2/17509; B41J 2/17513; B41J 2/1752;

(Continued)

(56) References Cited

U.S. PATENT DOCUMENTS

| | | | |
|---|---|---|---|
| 8,172,382 | B2 | 5/2012 | Kanbe et al. |
| 2002/0140778 | A1 | 10/2002 | Yoshiyama et al. |

(Continued)

FOREIGN PATENT DOCUMENTS

| | | | |
|---|---|---|---|
| JP | 2014-43016 | A | 3/2014 |
| JP | 2015-93428 | A | 5/2015 |

(Continued)

OTHER PUBLICATIONS

Office Action (Notice of Reasons for Refusal) issued in corresponding Japanese Patent Application No. 2019-005745, dated May 16, 2023.

(Continued)

*Primary Examiner* — Henok D Legesse
(74) *Attorney, Agent, or Firm* — Merchant & Gould P.C.

(57) ABSTRACT

A system includes:
- a housing;
- a first tank;
- a second tank;
- a first reservoir configured to be connected to the first tank;
- a second reservoir configured to be connected to the second tank; and
- a liquid discharge head that ejects the liquid supplied from the first tank and the second tank.

The housing includes:
- a front wall;
- a rear wall facing the front wall; and
- a housing side contact, (Continued)

the first reservoir and the second reservoir includes:
a liquid flow hole;
a first outer wall; and
a second outer wall facing the first outer wall,
the first tank includes a first flow pipe, and
the second tank includes a second flow pipe.

The system further includes a circuit board that is disposed on the second outer wall and has a reservoir side contact that contacts the housing side contact.

16 Claims, 19 Drawing Sheets

Related U.S. Application Data continuation of application No. 16/743,448, filed on Jan. 15, 2020, now Pat. No. 11,027,551.

(52) U.S. Cl.
CPC ......... *B41J 2/17513* (2013.01); *B41J 2/1752* (2013.01); *B41J 2/17523* (2013.01); *B41J 2/17546* (2013.01); *B41J 2/17553* (2013.01); *B41J 2/17566* (2013.01); *B41J 29/13* (2013.01); *B41J 2/1753* (2013.01)

(58) Field of Classification Search
CPC ............... B41J 2/17523; B41J 2/17546; B41J 2/17553; B41J 2/17566; B41J 29/13; B41J 2/1753
See application file for complete search history.

(56) References Cited

U.S. PATENT DOCUMENTS

| | | | | |
|---|---|---|---|---|
| 2005/0068391 | A1* | 3/2005 | Inoue | B41J 2/1752 347/86 |
| 2010/0201761 | A1 | 8/2010 | Lu et al. | |
| 2014/0055535 | A1 | 2/2014 | Takagi et al. | |
| 2015/0130879 | A1 | 5/2015 | Kimura et al. | |
| 2015/0174907 | A1 | 6/2015 | Kimura et al. | |
| 2016/0009096 | A1 | 1/2016 | Suzuki et al. | |
| 2016/0009100 | A1 | 1/2016 | Kudo et al. | |
| 2016/0016409 | A1 | 1/2016 | Kimura et al. | |
| 2016/0288519 | A1 | 10/2016 | Danzuka et al. | |
| 2017/0008298 | A1 | 1/2017 | Suzuki et al. | |
| 2017/0120610 | A1 | 5/2017 | Fukui et al. | |
| 2017/0120617 | A1* | 5/2017 | Matsumura | B41J 29/38 |
| 2017/0341405 | A1 | 11/2017 | Maruyama | |
| 2017/0355191 | A1 | 12/2017 | Mizutani et al. | |
| 2017/0355194 | A1 | 12/2017 | Fukasawa et al. | |
| 2017/0355195 | A1 | 12/2017 | Fukasawa et al. | |
| 2017/0355196 | A1 | 12/2017 | Shinada et al. | |
| 2017/0355197 | A1 | 12/2017 | Kudo et al. | |
| 2018/0215164 | A1 | 8/2018 | Hayashi et al. | |
| 2018/0244052 | A1* | 8/2018 | Okumura | B41J 2/16517 |
| 2018/0244058 | A1* | 8/2018 | Hayashi | B41J 29/02 |
| 2018/0244060 | A1 | 8/2018 | Hayashi et al. | |
| 2019/0299624 | A1 | 10/2019 | Mizutani et al. | |
| 2019/0299625 | A1 | 10/2019 | Mizutani et al. | |
| 2020/0070523 | A1 | 3/2020 | Fukasawa et al. | |
| 2020/0070532 | A1* | 3/2020 | Osakabe | B41J 29/13 |
| 2020/0282730 | A1 | 9/2020 | Mizutani et al. | |
| 2020/0298579 | A1 | 9/2020 | Mizutani et al. | |
| 2021/0023850 | A1 | 1/2021 | Misutani et al. | |
| 2021/0237456 | A1 | 8/2021 | Mizutani et al. | |
| 2021/0347180 | A1 | 11/2021 | Hayashi et al. | |
| 2022/0032638 | A1 | 2/2022 | Mizutani et al. | |

FOREIGN PATENT DOCUMENTS

| | | | | |
|---|---|---|---|---|
| JP | 2015-134420 | A | | 7/2015 |
| JP | 2016-196109 | A | | 11/2016 |
| JP | 2017-81078 | A | | 4/2017 |
| JP | 2017-081121 | A | | 5/2017 |
| JP | 2017-209948 | A | | 11/2017 |
| JP | 2017-222152 | A | | 12/2017 |
| JP | 2018-1446 | A | | 1/2018 |
| JP | 2018001446 | A | * | 1/2018 |
| JP | 2018-122515 | A | | 8/2018 |
| JP | 2018-140607 | A | | 9/2018 |
| JP | 2018-187779 | A | | 11/2018 |

OTHER PUBLICATIONS

Office Action (Notice of Reasons for Refusal) issued in corresponding Japanese Patent Application No. 2019-005744, dated Apr. 4, 2023.

Office Action issued in corresponding Japanese Patent Application No. 2019-005744, dated Dec. 6, 2022.

Office Action issued in corresponding Japanese Patent Application No. 2019-005745, dated Dec. 6, 2022.

* cited by examiner

SYSTEM INCLUDING A RESERVOIR CONFIGURED TO STORE LIQUID AND A TANK TO WHICH THE RESERVOIR CAN BE CONNECTED

CROSS-REFERENCE TO RELATED APPLICATIONS

This application is a Continuation Application of U.S. Ser. No. 17/325,352, filed May 20, 2021, now U.S. Pat. No. 11,584,130, which is a continuation of Ser. No. 16/743,448, filed Jan. 15, 2020, now U.S. Pat. No. 11,027,551, which claims benefit of Serial Nos. 2019-005744, filed on Jan. 17, 2019 in Japan, and 2019-005745, filed on Jan. 17, 2019 in Japan, and which applications are incorporated herein by reference. To the extent appropriate, a claim of priority is made to each of the above disclosed applications.

TECHNICAL FIELD

The present invention relates to a system including a reservoir that is configured to store liquid and a tank to which the reservoir can be connected.

BACKGROUND

A system including a reservoir that stores liquid and a tank to which the reservoir can be connected is known from the related art. For example, JP-A-2017-81121 discloses a system that includes an ink bottle that stores ink, and an ink jet recording apparatus including an ink tank to which the ink bottle can be connected.

The inkjet recording apparatus disclosed in JP-A-2017-81121 includes four ink tanks, and an ink bottle as a reservoir is connected to each ink tank. Accordingly, ink is injected from the ink bottle into the ink tank. When the user operates the ink jet recording apparatus (for example, when the user operates the touch panel of the ink jet recording apparatus or sets sheet in the ink jet recording apparatus), as viewed from the user, three of the four ink tanks are arranged on the right side of the discharge tray that supports the sheets discharged from the ink jet recording apparatus. One of the four ink tanks is disposed on the left side of the discharge tray.

In addition, as an example of a reservoir to be mounted on an ink jet recording apparatus, an ink cartridge can be exemplified. Some ink cartridges include a circuit board. A memory on which information such as ink color, material, and storage amount is stored is mounted on the circuit board. Also, an electrode is formed on the circuit board. The electrode is conducted to a contact disposed in the ink jet recording apparatus in a state where the ink cartridge is connected to the ink tank. As a result, the ink jet recording apparatus can read out the information stored in the memory.

For example, JP-A-2018-122515 discloses a system including an ink cartridge for storing ink and an image recording apparatus including a tank to which the ink cartridge can be connected.

The image recording apparatus disclosed in JP-A-2018-122515 includes a feed tray that supports sheets fed into the apparatus and a discharge tray that supports sheets discharged from the apparatus. The feed tray and the discharge tray are disposed in the center in the width direction of the image recording apparatus.

The image recording apparatus disclosed in JP-A-2018-122515 includes four tanks, and an ink cartridge is connected to each tank. When the user operates the image recording apparatus (for example, when the user operates the touch panel of the image recording apparatus or sets sheet in the image recording apparatus), as viewed from the user, all four tanks are arranged on the right side of the feed tray and discharge tray. Also, the ink cartridge is connected to the tank along the horizontal direction.

In the ink jet recording apparatus disclosed in JP-A-2017-81121, when an ink cartridge equipped with a circuit board is employed instead of an ink bottle, the problem is which part of the ink cartridge the circuit board can be attached to.

In the ink jet recording apparatus disclosed in JP-A-2017-81121, ink tanks are arranged at both left and right end portions inside the housing. In this case, when the circuit board is disposed on the right surface or the left surface of the ink cartridge as viewed from the user when the user operates the ink jet recording apparatus in a state where the ink cartridge is connected to the ink tank, the circuit board on the side of the ink jet recording apparatus that is electrically conducted to the circuit board also needs to be arranged in both left and right end portions of the ink jet recording apparatus, and the ink jet recording apparatus becomes larger accordingly. Therefore, it is desirable that the circuit board is disposed on other than the right surface and the left surface of the ink cartridge.

In addition, in the ink jet recording apparatus disclosed in JP-A-2017-81121, the front surface of the ink tank is exposed to the outside, and the user can check the remaining amount of the ink stored in the ink tank through the front surface. For this reason, it is desirable that the circuit board is disposed on other than the front surface of the ink cartridge.

1 Furthermore, if the ink leaking from the ink cartridge or the ink tank adheres to the circuit board, there is a concern that the circuit board may not function normally, and for example, information stored in the memory may not be read.

The present invention has been made in view of the above-described circumstances, and an object thereof is to provide a system capable of suppressing an increase in the size of a housing and reducing the possibility of liquid adhesion to a circuit board.

On the other hand, in the image recording apparatus disclosed in JP-A-2018-122515, when the user operates the image recording apparatus, as viewed from the user, the tank is disposed on the right side of the feed tray and the discharge tray, whereas the tank is not disposed on the left side of the feed tray and the discharge tray. Therefore, the image recording apparatus disclosed in JP-A-2018-122515 cannot effectively use the space on the left side of the feed tray and the discharge tray. Therefore, the enlargement of the tank size has been restricted.

Further, in the image recording apparatus disclosed in JP-A-2018-122515, since the ink cartridge is connected to the tank along the horizontal direction, there is a concern that the ink cartridge will accidentally come out of the tank.

The present invention has been made in view of the above-described circumstances, and an object thereof is to provide a system capable of increasing the size of a tank and reducing the possibility that a reservoir connected to the tank will accidentally come out of the tank.

SUMMARY

According to an aspect of the invention, a system includes:

- a housing that includes a conveyance path that extends in a depth direction intersecting a height direction of the housing and through which a sheet passes;

a first tank that is disposed on one side of the conveyance path inside the housing in a width direction perpendicular to the height direction and the depth direction and configured to store liquid;

a second tank that is disposed on the other side of the conveyance path inside the housing in the width direction and configured to store liquid;

a first reservoir that is configured to be connected to the first tank and configured to store liquid;

a second reservoir that is configured to be connected to the second tank and configured to store liquid; and a liquid discharge head that is disposed inside the housing and ejects the liquid supplied from the first tank and the second tank, wherein the housing includes:

a front wall having an opening through which a sheet is discharged;

a rear wall facing the front wall; and a housing side contact, each of the first reservoir and the second reservoir includes:

a liquid flow hole which is configured to lead the stored liquid to the outside;

a first outer wall that has translucency and is visible from the outside of the housing through a translucent portion formed in the front wall and having translucency when the first reservoir is connected to the first tank or the second reservoir is connected to the second tank; and a second outer wall located between the first outer wall and the rear wall when the first reservoir is connected to the first tank or the second reservoir is connected to the second tank, and facing the first outer wall, the first tank includes a first flow pipe that extends upward from an upper end of the first tank and is configured to be connected to the liquid flow hole of the first reservoir, the second tank includes a second flow pipe that extends upward from an upper end of the second tank and is configured to be connected to the liquid flow hole of the second reservoir, and the system further includes a circuit board that is disposed on the second outer wall and has a reservoir side contact that contacts the housing side contact when the first reservoir is connected to the first tank or the second reservoir is connected to the second tank.

The second outer wall is a wall facing the first outer wall. Here, the first outer wall is visible from the outside of the housing through the translucent portion formed in the front wall of the housing when the first reservoir and the second reservoir (hereinafter, the first reservoir and the second reservoir are collectively referred to as a reservoir) are connected to the first tank and the second tank (hereinafter, the first tank and the second tank are collectively referred to as a tank). According to this configuration, the circuit board is disposed on the second outer wall. As a result, it is not necessary to arrange a mechanism such as a housing side contact that is electrically conducted to the circuit board, with a reservoir in the width direction. Therefore, it is possible to suppress an increase in the size of the housing in the width direction due to the arrangement of the circuit board.

Further, according to this configuration, the reservoir is connected to the tank from above the housing. In other words, the liquid flow hole of the reservoir is formed in the wall facing downward in the reservoir. The second outer wall on which the circuit board is disposed is not a wall facing downward in the reservoir. Therefore, when the reservoir is connected to the tank and when the connection is released, the possibility that the liquid stored in the reservoir and the tank adheres to the circuit board can be reduced.

According to another aspect of the invention, a system includes:

a housing that includes a conveyance path that extends in a depth direction intersecting a height direction of the housing and through which a sheet passes;

a first tank that is disposed on one side of the conveyance path inside the housing in a width direction perpendicular to the height direction and the depth direction and configured to store liquid;

a second tank that is disposed on the other side of the conveyance path inside the housing in the width direction and configured to store liquid;

a first reservoir that is configured to be connected to the first tank and configured to store liquid;

a second reservoir that is configured to be connected to the second tank and configured to store liquid; and a liquid discharge head that is disposed inside the housing and ejects the liquid supplied from the first tank and the second tank, wherein each of the first reservoir and the second reservoir includes a liquid flow hole through which the stored liquid is flowable to the outside the reservoir, the first tank includes a first flow pipe that extends upward from an upper end of the first tank and is configured to be connected to the liquid flow hole of the first reservoir, and the second tank includes a second flow pipe that extends upward from an upper end of the second tank and is configured to be connected to the liquid flow hole of the second reservoir.

According to this configuration, the first tank and the second tank (hereinafter, the first tank and the second tank are collectively referred to as a tank) are arranged separately in one side and the other side of the conveyance path in the width direction. Therefore, the size of each tank can be enlarged compared with the configuration in which all the tanks are arranged only on one side of the conveyance path in the width direction.

Further, according to this configuration, the reservoir is connected to the tank from above. Therefore, it is possible to reduce the possibility that the reservoir will accidentally come out of the tank, compared to the configuration in which the reservoir is connected to the tank along the horizontal direction.

BRIEF DESCRIPTION OF DRAWINGS

FIGS. 19A and 19B are longitudinal cross-sectional views around the ink cartridge 30 in a mounted state according to the modification, in which FIG. 19A illustrates a state where the cover 18 is in the covering position, and FIG. 19B illustrates a state where the cover 18 is in the opening position.

DETAILED DESCRIPTION OF PREFERRED EMBODIMENTS

Hereinafter, embodiments of the present invention will be described with reference to the drawings as appropriate. The embodiment described below is merely an example in which the present invention is embodied, and it is needless to say that the embodiment can be appropriately changed without departing from the gist of the present invention.

[Overall Configuration of Multifunction Device 10]

Figure 1:
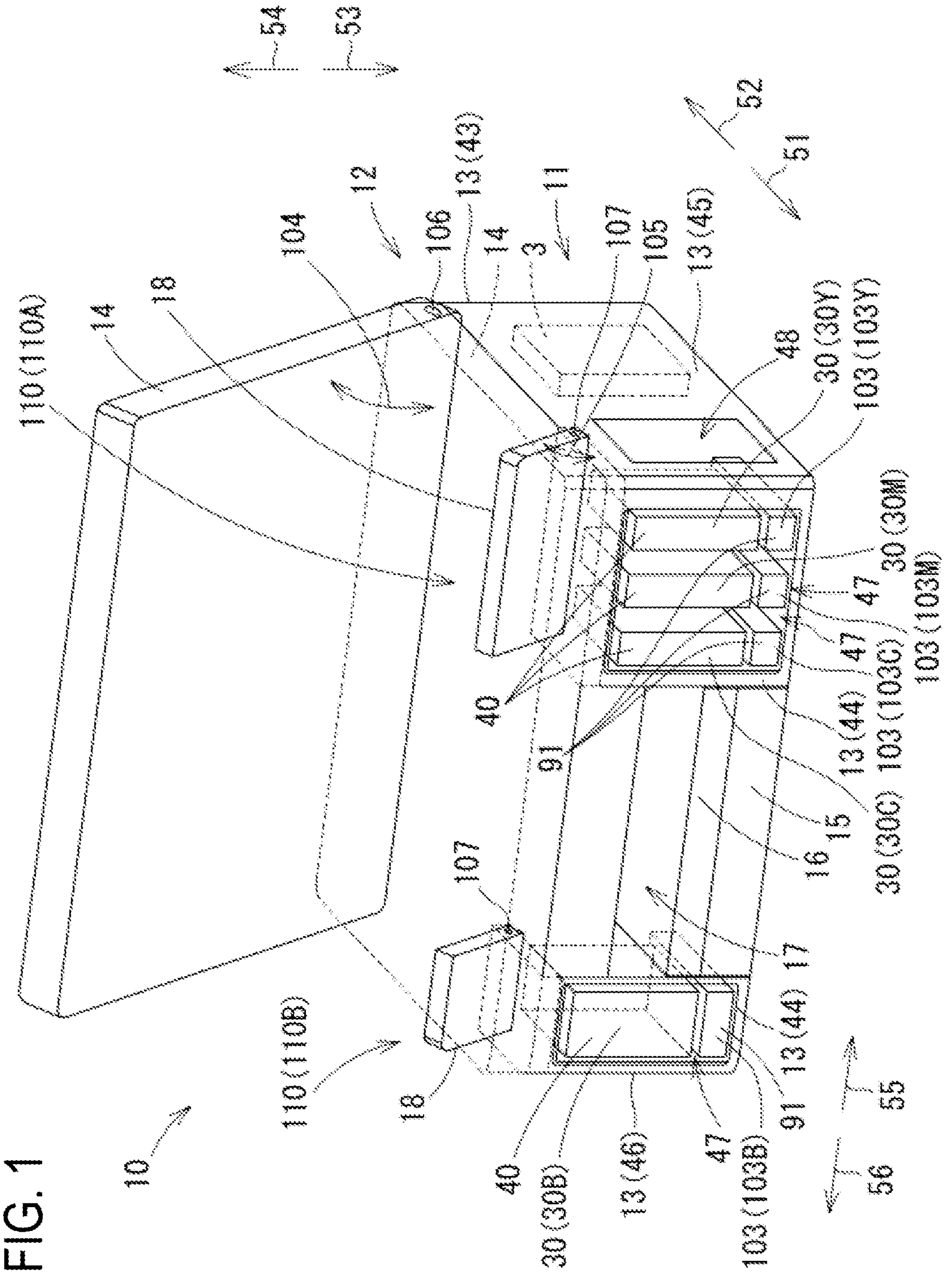
FIG. 1 is a perspective view of a multifunction device 10 in which an ink cartridge 30 is mounted.
Figure 2:
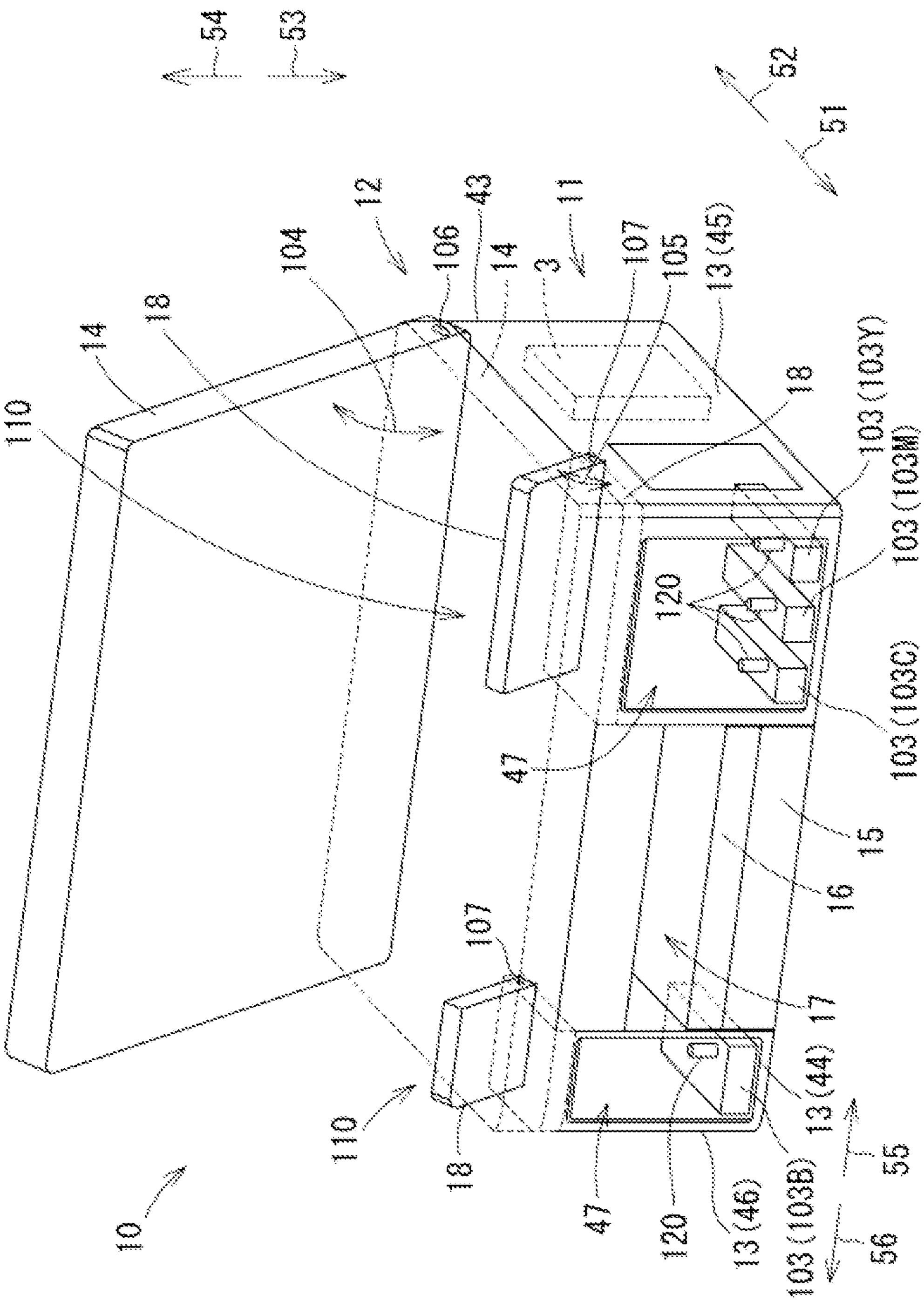
FIG. 2 is a perspective view of the multifunction device 10 in which the ink cartridge 30 is not mounted.

As illustrated in FIGS. 1 and 2, the multifunction device 10 has a substantially rectangular parallelepiped shape as a whole.

The gravity direction is defined as a downward direction 53 and the opposite direction to the downward direction 53 is defined as an upward direction 54, based on a posture in which the multifunction device 10 is installed on a horizontal plane so as to be usable. Also, a forward direction 51 and a rearward direction 52 opposite to the forward direction 51 are defined with the wall provided with an opening 17 of the multifunction device 10 as a front wall 44. Further, a right direction 55 and a left direction 56 are defined when the multifunction device 10 is viewed from the front. The upward direction 54 and the downward direction 53, the forward direction 51 and the rearward direction 52, and the right direction 55 and the left direction 56 are orthogonal to each other. The forward direction 51 and the rearward direction 52 are defined as a front-rear direction (an example of a depth direction). The upward direction 54 and the downward direction 53 are defined as a vertical direction (an example of a height direction). The right direction 55 and the left direction 56 are defined as a left-right direction (an example of a width direction).

The multifunction device 10 includes a printer 11 and a scanner 12. The multifunction device 10 and an ink cartridge 30 described later constitute a system.

The printer 11 is an image recording apparatus that records an image by ejecting ink droplets onto a sheet 2 (an example of a sheet, see FIG. 3) based on an inkjet recording method, and is, for example, an inkjet printer. The scanner 12 is a flat-bed scanner.

The printer 11 is in a lower housing 13 (an example of a housing) of the multifunction device 10. The scanner 12 is above the printer 11 in the lower housing 13. The scanner 12 may be provided in an upper housing 14 of the multifunction device 10.

The lower housing 13 has a box shape in which at least a part of the upper end is opened. The lower housing 13 includes the front wall 44, a rear wall 43, a right side wall 45, and a left side wall 46. The front wall 44 is a wall extending in the vertical direction and the left-right direction, and includes the opening 17. The rear wall 43 is a wall extending in the vertical direction and the left-right direction, and faces the front wall 44 in the front-rear direction. The right side wall 45 is a wall extending in the vertical direction and the front-rear direction, and connects the right end of the front wall 44 and the right end of the rear wall 43. The left side wall 46 is a wall extending in the vertical direction and the front-rear direction, and connects the left end of the front wall 44 and the left end of the rear wall 43.

The upper housing 14 is above the lower housing 13. The upper housing 14 is connected to the lower housing 13 at the rear end portion of the multifunction device 10. The upper housing 14 is rotatable in the direction of an arrow 104 about a shaft 106 positioned in a connection portion with the lower housing 13. Therefore, the upper housing 14 can be rotated between a covering position indicated by a broken line in FIG. 1 and an opening position indicated by a solid line in FIG. 1. The upper housing 14 in the covering position covers the upper end of the lower housing 13. The upper housing 14 in the opening position opens the upper end of the lower housing 13.

Figure 3:
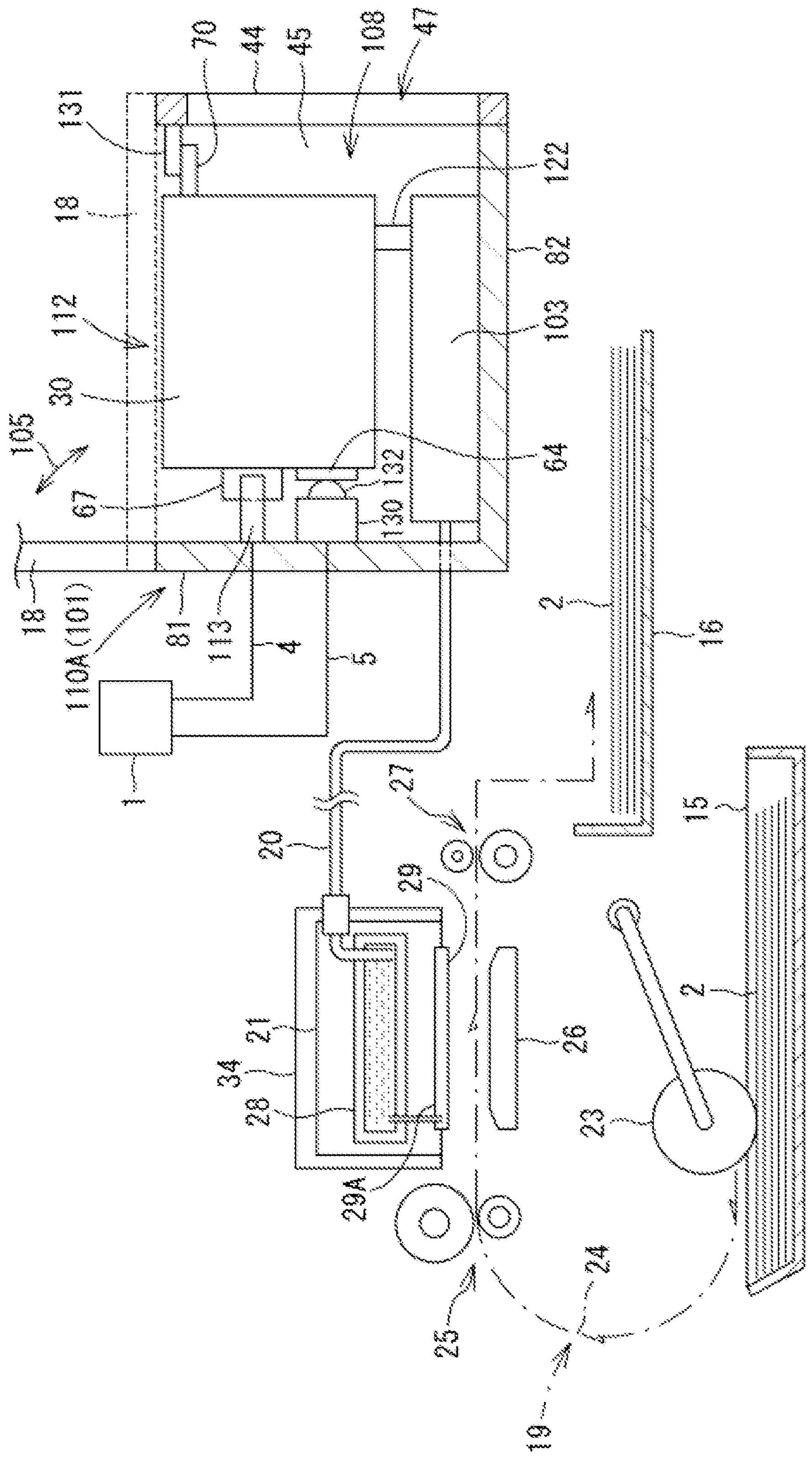
FIG. 3 is a longitudinal cross-sectional view schematically illustrating the internal structure of the multifunction device 10.

As illustrated in FIG. 3, the multifunction device 10 includes a recording head 21 (an example of a liquid discharge head), a mounting unit 110, and an ink tube 20. At least one tank 103 capable of storing ink is disposed in the mounting unit 110. The ink cartridge 30 is mounted on the mounting unit 110. The ink cartridge 30 stores ink (an example of liquid) supplied to the recording head 21. The ink cartridge 30 mounted on the mounting unit 110 is connected to the tank 103. The ink tube 20 connects the recording head 21 and at least one tank 103. An opening 112 is formed at the upper end of the mounting unit 110.

Figure 8:
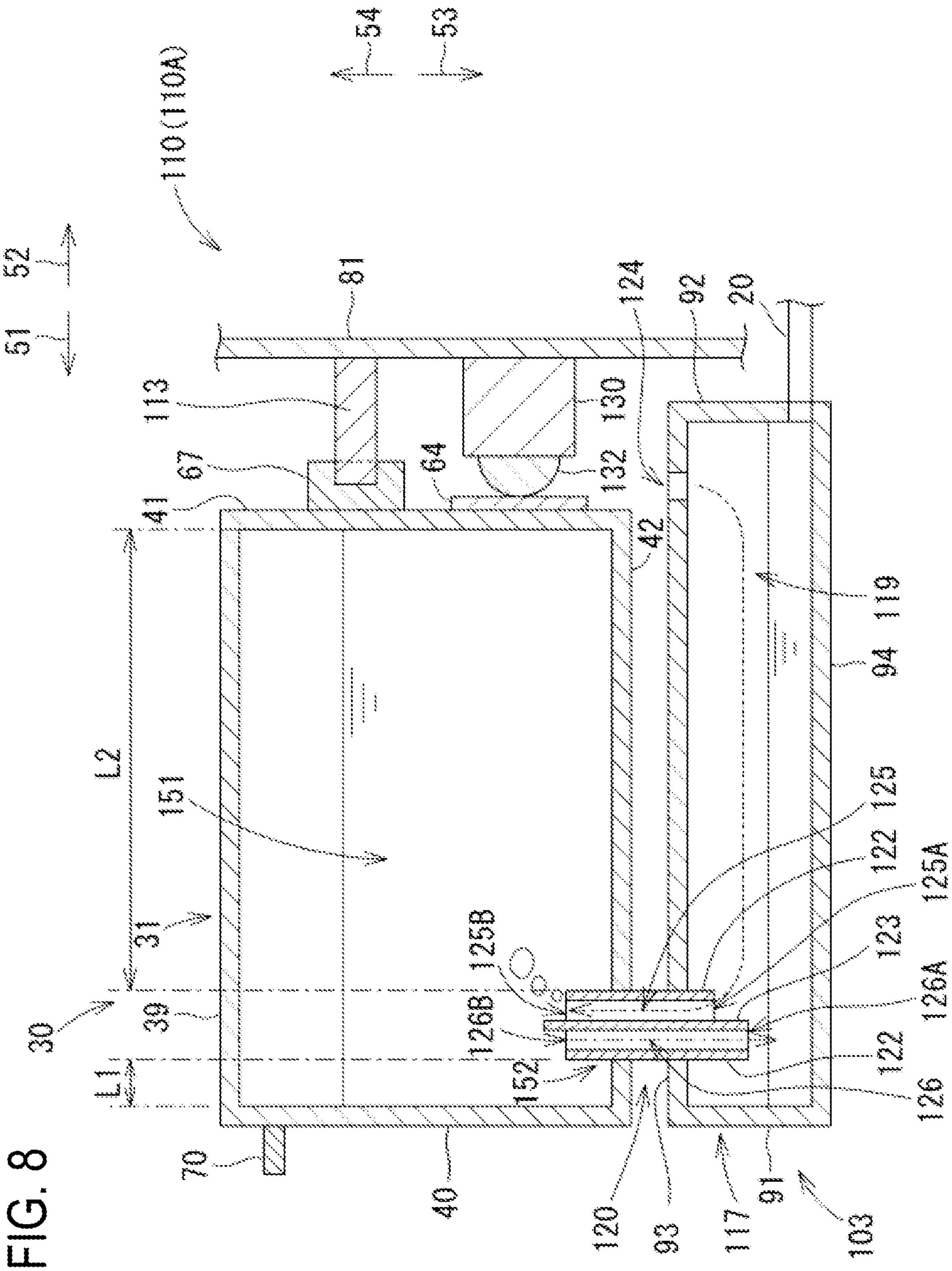
FIG. 8 is a longitudinal cross-sectional view around the ink cartridge 30 in a mounted state.

The ink cartridge 30 is inserted and mounted in the mounting unit 110 from above to below through the opening 112. The ink cartridge 30 is extracted from the mounting unit 110 from below to above through the opening 112. FIGS. 1, 3, and 8 illustrate a mounting state in which the mounting of the ink cartridge 30 on the mounting unit 110 is completed. FIG. 2 illustrates a state where the ink cartridge 30 is not mounted on the mounting unit 110.

As illustrated in FIG. 3, the ink cartridge 30 and the recording head 21 are connected via the tank 103 and the ink tube 20 in the mounted state. The recording head 21 is disposed inside the lower housing 13. The recording head 21 includes a sub-tank 28. The sub-tank 28 temporarily stores the ink supplied through the ink tube 20. The recording head 21 ejects the ink supplied from the sub-tank 28 from nozzles 29 by the inkjet recording method. Specifically, a driving voltage is selectively applied from a head control board (not illustrated) provided in the recording head 21 to piezo elements 29A provided corresponding to the nozzles 29. Thus, ink is ejected from the nozzles 29. The recording head 21 is mounted on a carriage 34. The carriage 34 is supported by a frame (not illustrated) of the lower housing 13 so as to be movable in the left-right direction.

The multifunction device 10 includes a sheet feed tray 15, a feed roller 23, a conveyance roller pair 25, a platen 26, a discharge roller pair 27, and a sheet discharge tray 16. The sheet 2 fed from the feed tray 15 to a conveyance path 24 by the feed roller 23 is conveyed in a conveying direction 19 by the conveyance roller pair 25. The conveying direction 19 is indicated by a dashed-dotted arrow in FIG. 3. When the sheet 2 is conveyed to the platen 26 by the conveyance roller pair 25, the carriage 34 moves along the left-right direction. At this time, the recording head 21 ejects ink onto the sheet passing on the platen 26. As a result, an image is recorded on the sheet 2. The sheet 2 having passed through the platen 26 is supported on the discharge tray 16 provided on the most downstream side of the conveyance path 24 by the discharge roller pair 27. The sheet 2 supported on the discharge tray 16 is discharged through the opening 17.

Figure 5:
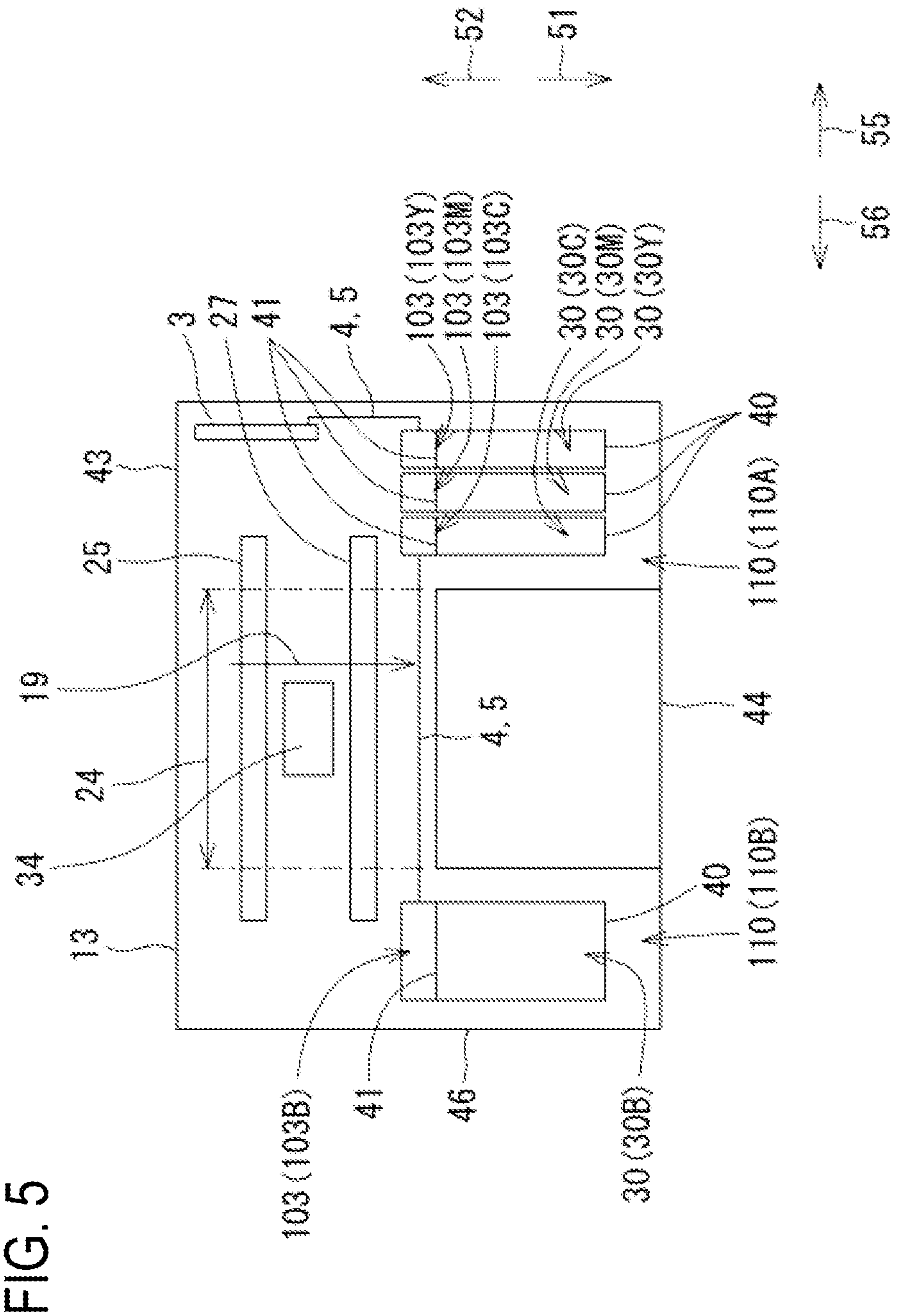
FIG. 5 is a plan view of the lower housing 13.

As illustrated in FIG. 5, the conveyance path 24 extends in the front-rear direction from the conveyance roller pair 25 to the discharge roller pair 27 through the recording head 21 and the platen 26. The conveyance path 24 is formed in the central portion of the lower housing 13 in the substantially left-right direction. The carriage 34 can move to a region where the conveyance path 24 is formed (a region between two dashed-dotted lines in FIG. 5), a region on the right side of the conveyance path 24, and a region on the left side of the conveyance path 24.

[Mounting Unit 110]

As illustrated in FIGS. 1 and 2, the mounting unit 110 includes a mounting unit 110A disposed at the right end portion of the lower housing 13 and a mounting unit 110B disposed at the left end portion of the lower housing 13. As illustrated in FIG. 5, the mounting unit 110A is on the right side of the conveyance path 24. The mounting unit 110B is on the left side of the conveyance path 24. The mounting unit 110A and the mounting unit 110B have substantially the same configuration. Therefore, in the following, the configuration of the mounting unit 110A will be described, and the configuration of the mounting unit 110B will be omitted in principle and will be described as necessary.

As illustrated in FIG. 3, the mounting unit 110A includes a holder 101, the tank 103, an optical sensor 113, a connector 130, and a stopper 131. The mounting unit 110A may not include the optical sensor 113.

[Holder 101]

As illustrated in FIG. 3, the holder 101 constitutes the housing of the mounting unit 110A. The holder 101 includes a back wall 81 and a bottom wall 82. The back wall 81 is located behind the front wall 44 of the lower housing 13 and faces the front wall 44 in the front-rear direction. The bottom wall 82 extends forward from the lower end portion of the back wall 81. An internal space 108 of the holder 101 is formed by the back wall 81, the bottom wall 82, the front wall 44 of the lower housing 13, and the right side wall 45 (an example of a side wall) of the lower housing 13. The right side wall 45 extends rearward from the right end portion of the front wall 44 and constitutes the right end of the lower housing 13.

In the case of the mounting unit 110B, the internal space 108 of the holder 101 is formed by the back wall 81, the bottom wall 82, the front wall 44 of the lower housing 13, and the left side wall 46 (an example of the side wall) of the lower housing 13. The left side wall 46 extends rearward from the left end portion of the front wall 44 and constitutes the left end of the lower housing 13.

Figure 4:
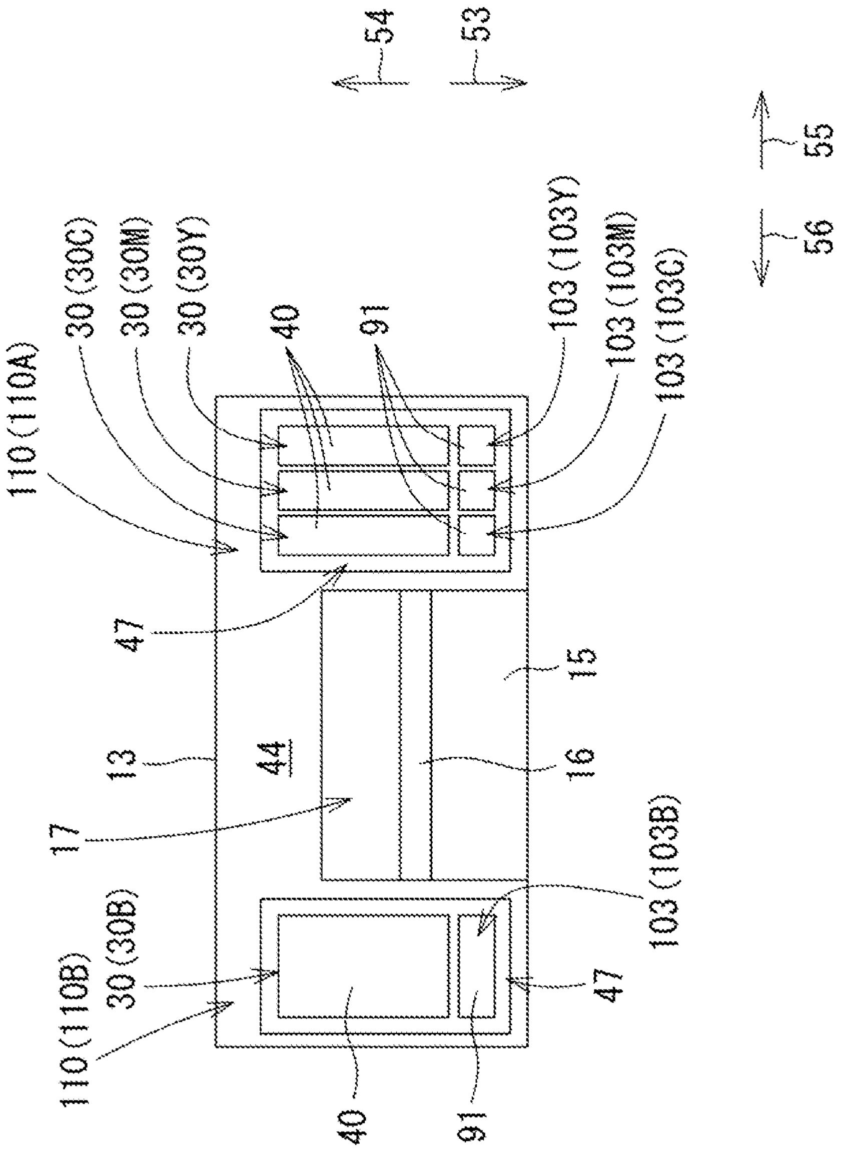
FIG. 4 is a front view of a lower housing 13.
Figure 6B:
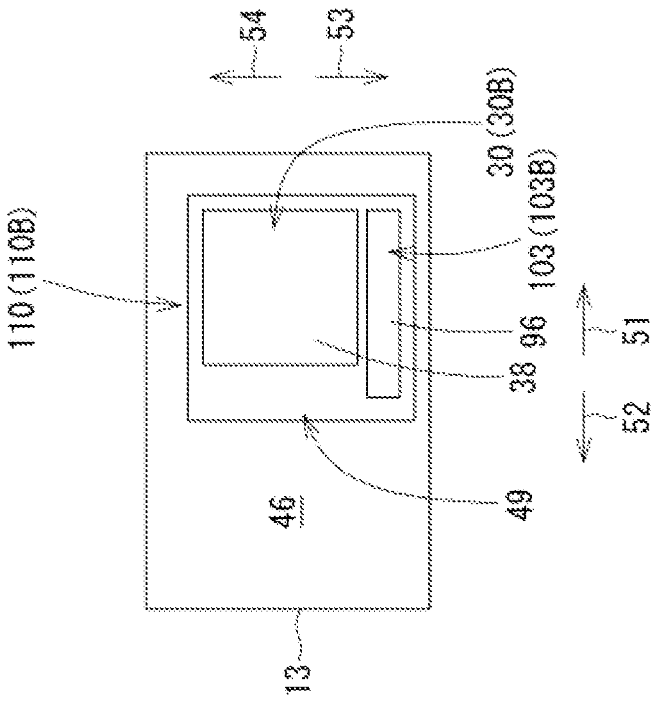
FIG. 6B is a left side view of the lower housing 13.
Figure 6A:
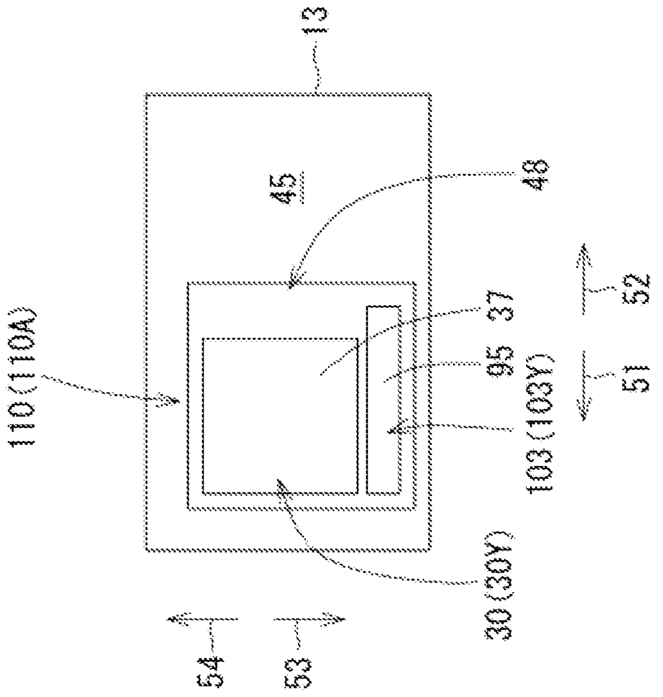
FIG. 6A is a right side view of the lower housing 13.

As illustrated in FIGS. 1 and 4, openings 47 (an example of a first translucent portion) are formed in the right end portion and the left end portion of the front wall 44. As illustrated in FIGS. 1 and 6A, an opening 48 (an example of a second translucent portion) is formed in the front end portion of the right side wall 45. As illustrated in FIG. 6B, an opening 49 (an example of the second translucent portion) is formed in the front end portion of the left side wall 46.

As illustrated in FIG. 3, the upper end of the holder 101 facing the bottom wall 82 in the vertical direction is an opening 112 that communicates the internal space 108 of the holder 101 with the outside of the holder 101.

There is a cover 18 near the opening 112 of the holder 101. The cover 18 is rotatably supported by the upper end portion of the back wall 81. When the upper housing 14 is in the opening position, the cover 18 can be rotated in the direction of an arrow 105 about a shaft 107 positioned in the connection portion with the back wall 81. Accordingly, the cover 18 can be rotated between a covering position that is illustrated by a broken line in FIGS. 1 to 3 and closes the opening 112, and an opening position that is illustrated by a solid line in FIGS. 1 to 3 and exposes the opening 112 to the outside.

As illustrated in FIGS. 1 and 3, when the ink cartridge 30 is connected to the tank 103, the cover 18 in the covering position covers the upper end of the ink cartridge 30, and the cover 18 in the opening position opens the upper end of the ink cartridge 30.

The internal space 108 of the holder 101 is partitioned into three rooms arranged in the left-right direction by a partition wall (not illustrated). The tank 103, the optical sensor 113, and the connector 130 can be arranged in each room of the partitioned internal space 108. The internal space 108 may not include the partition wall. In this case, all the tanks 103, the optical sensors 113, and the connectors 130 which are to be arranged are arranged in the internal space 108 that is one room.

In the present embodiment, one ink cartridge 30 is mounted on the mounting unit 110B. Therefore, the internal space 108 of the holder 101 of the mounting unit 110B is not partitioned into a plurality of rooms (is constituted of one room).

In the present embodiment, in each of the three rooms of the mounting unit 110A, the tank 103 and the optical sensor 113 are arranged but the connector 130 is not arranged. On the other hand, the tank 103, the optical sensor 113, and the connector 130 are arranged in one room of the mounting unit 110B.

The number of rooms in the internal space 108 of the holders 101 of the mounting units 110A and 110B, and the number of tanks 103, optical sensors 113, and connectors 130 arranged in each of the rooms are not limited to the above number.

[Tank 103]

As illustrated in FIG. 3, the tank 103 is located below the internal space 108 of the holder 101. The tank 103 is supported by the bottom wall 82.

As described above, the internal space 108 of the holder 101 of the mounting unit 110A is partitioned into three rooms arranged in the left-right direction. That is, as illustrated in FIG. 4, three tanks 103 are arranged in parallel along the left-right direction in the internal space 108 of the holder 101 of the mounting unit 110A. When a plurality of tanks 103 are arranged in the mounting unit 110B, the plurality of tanks 103 may also be arranged in parallel along the left-right direction.

Figure 7A:
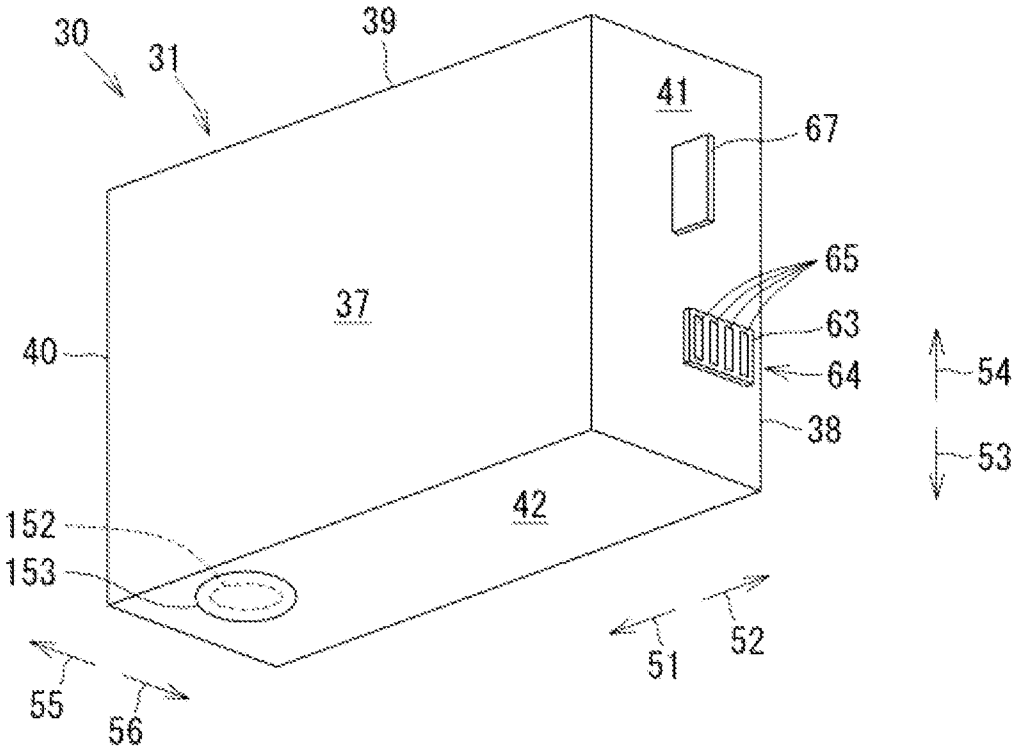
FIG. 7A is a perspective view of the ink cartridge 30.
Figure 7B:
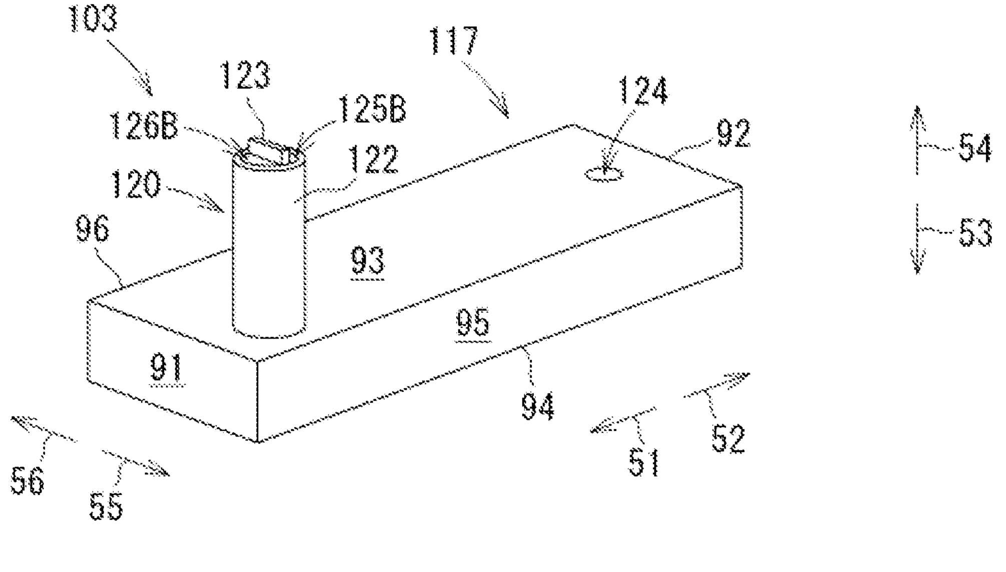
FIG. 7B is a perspective view of the tank 103.

As illustrated in FIG. 7B, the tank 103 includes a housing 117 having a substantially rectangular parallelepiped shape.

The housing 117 includes a front wall 91 (an example of a first wall), a rear wall 92, an upper wall 93, a lower wall 94, a right side wall 95 (an example of the first wall), and a left side wall 96 (an example of the first wall). The front wall 91, the right side wall 95, and the left side wall 96 are examples of the first wall. The front wall 91 and the rear wall 92 are separated in the front-rear direction. The upper wall 93 is between the front wall 91 and the rear wall 92, and extends from the upper end of the front wall 91 to the upper end of the rear wall 92. The lower wall 94 is between the front wall 91 and the rear wall 92, and extends from the lower end of the front wall 91 to the lower end of the rear wall 92. The upper wall 93 and the lower wall 94 connect the front wall 91 and the rear wall 92. The right side wall 95 is between the front wall 91 and the rear wall 92, and extends from the right end of the front wall 91 to the right end of the rear wall 92. The left side wall 96 is between the front wall 91 and the rear wall 92, and extends from the left end of the front wall 91 to the left end of the rear wall 92. The right side wall 95 and the left side wall 96 connect the front wall 91 and the rear wall 92. The upper wall 93 and the lower wall 94 are separated in the vertical direction. The right side wall 95 and the left side wall 96 are separated in the left-right direction. The peripheral edges of the right side wall 95 and the left side wall 96 are continuous with the front wall 91, the rear wall 92, the upper wall 93, and the lower wall 94.

As illustrated in FIG. 8, the housing 117 includes an internal space 119. The internal space 119 is a space constituted by the front wall 91, the rear wall 92, the upper wall 93, the lower wall 94, the right side wall 95, and the left side wall 96. Ink can be stored in the internal space 119.

In the present embodiment, as illustrated in FIG. 2, in the three rooms of the internal space 108 of the holder 101 of the mounting unit 110A, a tank 103 in which cyan ink is stored (hereinafter referred to as a tank 103C), a tank 103 in which magenta ink is stored (hereinafter referred to as a tank 103M), and a tank 103 in which yellow ink is stored (hereinafter referred to as a tank 103Y) are arranged in order from the left room. In one room of the internal space 108 of the holder 101 of the mounting unit 110B, a tank 103 (hereinafter referred to as a tank 103B) in which black ink is stored is disposed. Hereinafter, the tanks 103C, 103M, 103Y, and 103B are collectively referred to as the tank 103. In the present embodiment, dye ink is stored in all the tanks 103. The tank 103B is an example of a first tank. The tanks 103C, 103M, and 103Y are examples of a second tank.

The color of the ink stored in each tank 103 is not limited to the color described above. The material of the ink stored in each tank 103 is not limited to dye. For example, in the tank 103 disposed in one room of the internal space 108 of the holder 101 of the mounting unit 110B, an ink having a specific gravity (second specific gravity) larger than the specific gravity (first specific gravity) of the ink stored in the tanks 103 arranged in three rooms of the internal space 108 of the holder 101 of the mounting unit 110A may be stored. Examples of the second specific gravity ink include white ink and pigment ink. Examples of the first specific gravity ink include cyan, magenta, and yellow inks, and dye ink.

Needless to say, the color and material of the ink stored in the tank 103 arranged in each room is not limited to the above-described example and can be set as appropriate.

The housing 117 has a translucency that allows the ink stored in the internal space 119 to be visually recognized from the outside.

As illustrated in FIGS. 1 and 4, the front wall 91 of the housing 117 faces the opening 47 formed in the front wall 44 of the lower housing 13 in the front-rear direction. Thus, when the lower housing 13 is viewed from the front, the front wall 91 is visible through the opening 47. The front wall 91 has translucency. Therefore, when the lower housing 13 is viewed from the front, the ink stored in the internal space 119 is visible through the opening 47 and the front wall 91. In the present embodiment, the ink stored in the tanks 103C, 103M, and 103Y is visible through the opening 47 and the front wall 91 formed in the right end portion of the front wall 44, and the ink stored in the tank 103B is visible through the opening 47 and the front wall 91 formed in the left end portion of the front wall 44.

As illustrated in FIGS. 1 and 6A, the right side wall 95 of the housing 117 faces the opening 48 formed in the right side wall 45 of the lower housing 13 in the left-right direction. Thus, when the lower housing 13 is viewed from the right, the right side wall 95 is visible through the opening 48. Moreover, the right side wall 95 has translucency. Therefore, when the lower housing 13 is viewed from the right, the ink stored in the internal space 119 is visible through the opening 48 and the right side wall 95. In the present embodiment, the ink stored in the tank 103Y is visible through the opening 48 and the right side wall 95.

As illustrated in FIG. 6B, the left side wall 96 of the housing 117 faces the opening 49 formed in the left side wall 46 of the lower housing 13 in the left-right direction. Thus, when the lower housing 13 is viewed from the left, the left side wall 96 is visible through the opening 49. Moreover, the left side wall 96 has translucency. Therefore, when the lower housing 13 is viewed from the left, the ink stored in the internal space 119 is visible through the opening 49 and the left side wall 96. In the present embodiment, the ink stored in the tank 103B is visible through the opening 49 and the left side wall 96.

In a housing 31 of the tank 103 (the tanks 103C, 103M, and 103Y in the present embodiment) mounted on the mounting unit 110A, it is sufficient that at least the front wall 91 facing the front and the right side wall 95 facing the right are translucent. Further, in the housing 31 of the tank 103 (the tank 103B in the present embodiment) mounted on the mounting unit 110B, it is sufficient that at least the front wall 91 facing the front and the left side wall 96 facing the left side are translucent.

In addition, all of the tanks 103B, 103C, 103M, and 103Y may not include a translucent wall, but it is preferable that at least one of the tanks 103B, 103C, 103M, and 103Y includes a translucent wall. Further, it is more preferable that all of the tanks 103B, 103C, 103M, and 103Y includes a translucent wall.

As illustrated in FIG. 7B, an air communication hole 124 that penetrates the upper wall 93 is formed in the upper wall 93 of the housing 117 of the tank 103. Therefore, the internal space 119 communicates with the atmosphere. Further, the internal space 119 communicates with the ink tube 20. As a result, the ink stored in the internal space 119 is supplied to the recording head 21 through the ink tube 20.

Figure 9:
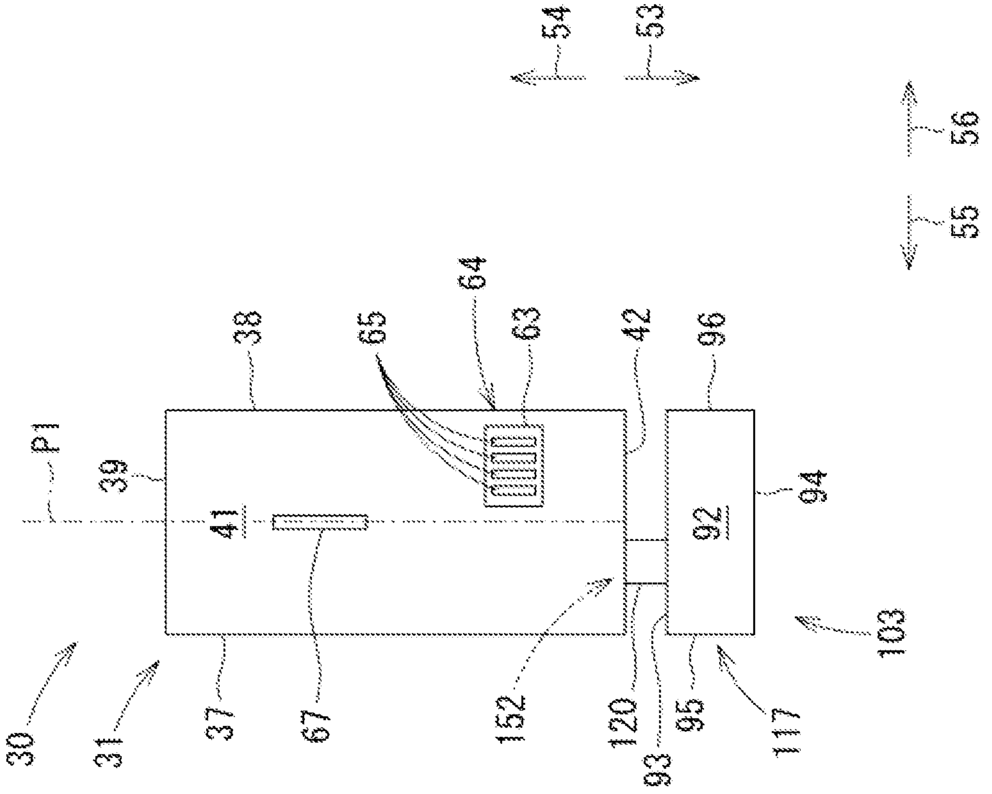
FIG. 9 is a rear view of the ink cartridge 30 and the tank 103 in a mounted state.

As illustrated in FIG. 8, the tank 103 includes a flow pipe 120. The flow pipe 120 provided in the tank 103B is an example of a first flow pipe. The flow pipe 120 provided in the tanks 103C, 103M, and 103Y is an example of a second flow pipe. In the present embodiment, the flow pipe 120 is disposed in the front portion of the tank 103 (position closer to the front wall 91 than to the rear wall 92 in the front-rear direction). In other words, in the front-rear direction, the distance between the front wall 91 and the flow pipe 120 is shorter than the distance between the rear wall 92 and the flow pipe 120. Further, as illustrated in FIG. 9, in the present embodiment, the flow pipe 120 is disposed on the right portion of the tank 103 (position closer to the right side wall 95 than to the left side wall 96 in the left-right direction). In other words, in the left-right direction, the distance between the right side wall 95 and the flow pipe 120 is shorter than the distance between the left side wall 96 and the flow pipe 120. The position of the flow pipe 120 is not limited to the position described above.

The flow pipe 120 extends in the vertical direction and penetrates the upper wall 93. The flow pipe 120 extends upward from the upper wall 93.

The flow pipe 120 includes an outer peripheral wall 122 and a partition wall 123. The partition wall 123 extends up to above the outer peripheral wall 122. The partition wall 123 divides the internal space of the outer peripheral wall 122 into two spaces. One of the two spaces is a first flow path 125. The other of the two spaces is a second flow path 126.

The first flow path 125 is a space surrounded by the rear portion of the outer peripheral wall 122 and the partition wall 123. An opening 125A is formed at one end of the first flow path 125, and an opening 125B is formed at the other end of the first flow path 125.

The second flow path 126 is a space surrounded by the front portion of the outer peripheral wall 122, and the partition wall 123. An opening 126A is formed at one end of the second flow path 126, and an opening 126B is formed at the other end of the second flow path 126.

The openings 125A and 126A are in the internal space 119. The openings 125A and 126A are below the air communication hole 124. The opening 126A is below the opening 125A.

The openings 125B and 126B are outside the tank 103. The opening 125B allows the internal space 119 to communicate with the outside of the tank 103 via the first flow path 125. The opening 126B allows the internal space 119 to communicate with the outside of the tank 103 via the second flow path 126.

[Optical Sensor 113]

As illustrated in FIGS. 3 and 8, the optical sensor 113 is disposed on the back wall 81 of the holder 101. The optical sensor 113 includes a light emitting portion and a light receiving portion. The light emitting portion and the light receiving portion are arranged to face each other with a space in the left-right direction.

The optical sensor 113 outputs different detection signals to the controller 1 (see FIG. 3) depending on whether or not the light emitted along the left-right direction from the light emitting portion is received by the light receiving portion. The optical sensor 113 and the controller 1 are connected by a cable 4. For example, the optical sensor 113 outputs a low-level signal to the controller 1 on condition that the light emitted from the light emitting portion cannot be received by the light receiving portion (that is, the light receiving intensity is less than a predetermined intensity). On the other hand, the optical sensor 113 outputs a high-level signal to the controller 1 on condition that the light output from the light emitting portion can be received by the light receiving portion (that is, the light receiving intensity is equal to or higher than a predetermined intensity).

The controller 1 controls the operation of the multifunction device 10 and includes, for example, a CPU, a ROM, a RAM, and the like. The CPU, the ROM, the RAM and the like are mounted on a control board 3. As illustrated in FIG. 1, the control board 3 is disposed in the right rear portion inside the lower housing 13. As illustrated in FIG. 5, the cable 4 that connects the optical sensor 113 of the mounting unit 110B and the control board 3 is located above the conveyance path 24 from the mounting unit 110B to the mounting unit 110A, is wired to the right through the front space of the recording head 21, and is wired rearward toward the control board 3 together with the cable 4 extending from the optical sensor 113 arranged corresponding to each of the tanks 103C, 103M, and 103Y of the mounting unit 110A. The cable 4 that connects the optical sensor 113 of the mounting unit 110A and the control board 3 is wired rearward from the mounting unit 110A toward the control board 3. The arrangement position of the control board 3 may be other than the right rear portion inside the lower housing 13. The wiring of the cable 4 is appropriately determined according to the arrangement position of the control board 3.

[Connector 130]

As illustrated in FIGS. 3 and 8, the connector 130 is disposed on the back wall 81 of the holder 101. The connector 130 includes four contacts 132 (an example of a housing side contact). The four contacts 132 are arranged in parallel at intervals in the left-right direction. Each contact 132 corresponds to each electrode 65 of a circuit board 64 of the ink cartridge 30. The number of contacts 132 is not limited to four.

The contact 132 is made of a member having conductivity and elasticity. The contact 132 protrudes forward from the connector 130. The contact 132 is connected to a substrate (not illustrated). Therefore, the contact 132 is electrically connected to the electric circuit similarly mounted on the substrate. The electric circuit is electrically connected to the controller 1 (see FIG. 3) by a cable 5. The cable 5 is wired in the same manner as the cable 4 (see FIG. 3).

In the present embodiment, the connector 130 is provided only for the tank 103B among the tanks 103B, 103C, 103M, and 103Y. That is, the connector 130 is provided corresponding to one room of the mounting unit 110B, and is not provided in the mounting unit 110A. However, the connector 130 may be provided corresponding to at least one of the tanks 103C, 103M, and 103Y. That is, the connector 130 may be provided in at least one of the three rooms of the mounting unit 110A.

[Stopper 131]

As illustrated in FIG. 3, the stopper 131 protrudes rearward from the upper end portion of the front wall 44 of the housing. The stopper 131 is for holding the ink cartridge 30 in a state of being mounted on the mounting unit 110. The stopper 131 is supported by the front wall 44 so as to be movable in the left-right direction. The stopper 131 can slide in the left-right direction between a holding position for holding the ink cartridge 30 in a state of being mounted on the mounting unit 110 (a state in which the ink cartridge 30 is connected to the tank 103) and a release position for releasing the holding. The stopper 131 provided in the mounting unit 110B (the stopper 131 protruding into the internal space 108 of the holder 101 of the mounting unit 110A) is an example of a first holding mechanism. The stopper 131 provided in the mounting unit 110A (the stopper

131 protruding into the internal space 108 of the holder 101 of the mounting unit 110B) is an example of a second holding mechanism.

When a later-described through-hole 152 of the ink cartridge 30 is configured to be open and closed by a valve urged by a spring, the stopper 131 restricts the ink cartridge 30 connected to the tank 103 from moving in the direction in which the connection with the tank 103 is released by the reaction force of the spring, thereby holding the state in which the ink cartridge 30 is connected to the tank 103. As in the present embodiment, when the ink cartridge 30 connected to the tank 103 does not move in the direction in which the connection with the tank 103 is released by the reaction force of the spring, the mounting unit 110 may not include the stopper 131.

[Ink Cartridge 30]

The ink cartridge 30 illustrated in FIG. 7A is a container that stores ink. Three ink cartridges 30 are accommodated in each room of the internal space 108 (see FIG. 3), which is divided into three, of the holder 101 of the mounting unit 110A. Further, one ink cartridge 30 is accommodated in the internal space 108 (see FIG. 3) of the holder 101 of the mounting unit 110B.

As described above, the internal space 108 of the holder 101 of the mounting unit 110A is partitioned into three rooms arranged in the left-right direction. That is, as illustrated in FIGS. 1 and 4, the three ink cartridges 30 mounted in the internal space 108 of the holder 101 of the mounting unit 110A are arranged in parallel along the left-right direction. When a plurality of ink cartridges 30 are arranged in the mounting unit 110B, the plurality of ink cartridges 30 may also be arranged in parallel along the left-right direction.

The color of the ink stored in the ink cartridge 30 arranged in each room of the internal space 108 is the same color as the color of the ink stored in the tank 103 arranged in each room. That is, in the present embodiment, in the three rooms of the internal space 108 of the holder 101 of the mounting unit 110A, an ink cartridge 30 in which cyan ink is stored (hereinafter referred to as an ink cartridge 30C), an ink cartridge 30 in which magenta ink is stored (hereinafter referred to as ink cartridge 30M), and an ink cartridge 30 in which yellow ink is stored (hereinafter referred to as ink cartridge 30Y) are mounted in order from the left room. In one room of the internal space 108 of the holder 101 of the mounting unit 110B, an ink cartridge 30 in which black ink is stored (hereinafter referred to as an ink cartridge 30B) is mounted. That is, the ink cartridge 30C is connected to the tank 103C, the ink cartridge 30M is connected to the tank 103M, the ink cartridge 30Y is connected to the tank 103Y, and the ink cartridge 30B is connected to the tank 103B. Hereinafter, the ink cartridges 30C, 30M, 30Y, and 30B are collectively referred to as the ink cartridge 30. The ink cartridge 30B is an example of a first reservoir. The ink cartridges 30C, 30M, and 30Y are examples of a second reservoir.

The number of ink cartridges 30 arranged in the internal space 108 and the color and material of the ink stored in the ink cartridge 30 arranged in each room are determined by the configuration of the mounting unit 110 (the number of rooms in the internal space 108 of the holder 101 of the mounting unit 110, and the color and material of the ink stored in each tank 103).

The ink cartridges 30C, 30M, 30Y, and 30B have substantially the same configuration except that the ink cartridge 30B is larger than the ink cartridges 30C, 30M, and 30Y. Therefore, the configuration of the ink cartridge 30B will be described below, and the configurations of the ink cartridges 30C, 30M, and 30Y will be omitted in principle and will be described as necessary. In the following, the configuration of the ink cartridge 30B will be described, but for convenience, the ink cartridge 30B will be referred to as the ink cartridge 30.

As illustrated in FIGS. 7A and 8, the ink cartridge 30 includes the housing 31, a protrusion 67, the circuit board 64, and a protrusion 70. In the following description of the configuration of the ink cartridge 30, the front-rear direction, the vertical direction and the left-right direction are defined, assuming that the ink cartridge 30 is in the standing posture (the posture connected to the tank 103 and the posture illustrated in FIG. 8), unless otherwise specified.

As illustrated in FIG. 7A, the housing 31 has a substantially rectangular parallelepiped shape. As a whole, the housing 31 has a flat shape in which the dimension along the left-right direction is smaller than the dimension along the front-rear direction, and the dimension along each of the vertical direction and the front-rear direction is larger than the dimension along the left-right direction.

The housing 31 includes a front wall 40 (an example of a first outer wall), a rear wall 41 (an example of a second outer wall), an upper wall 39 (an example of an upper outer wall), a lower wall 42 (an example of a lower outer wall), a right side wall 37 (an example of a third outer wall), and a left side wall 38 (an example of the third outer wall). The front wall 40 and the rear wall 41 are separated in the front-rear direction. The upper wall 39 is between the front wall 40 and the rear wall 41 and extends from the upper end of the front wall 40 to the upper end of the rear wall 41. The lower wall 42 is between the front wall 40 and the rear wall 41, and extends from the lower end of the front wall 40 to the lower end of the rear wall 41. The upper wall 39 and the lower wall 42 connect the front wall 40 and the rear wall 41. The right side wall 37 is between the front wall 40 and the rear wall 41, and extends from the right end of the front wall 40 to the right end of the rear wall 41. The left side wall 38 is between the front wall 40 and the rear wall 41, and extends from the left end of the front wall 40 to the left end of the rear wall 41. The right side wall 37 and the left side wall 38 connect the front wall 40 and the rear wall 41. The upper wall 39 and the lower wall 42 are separated in the vertical direction. The right side wall 37 and the left side wall 38 are separated in the left-right direction. The peripheral edges of the right side wall 37 and the left side wall 38 are continuous with the front wall 40, the rear wall 41, the upper wall 39, and the lower wall 42.

As illustrated in FIG. 8, the housing 31 includes an internal space 151. The internal space 151 is a space constituted by the front wall 40, the rear wall 41, the upper wall 39, the lower wall 42, the right side wall 37, and the left side wall 38. In the internal space 151, ink can be stored.

As illustrated in FIG. 3, the housing 31 is inserted and mounted downward with respect to the holder 101 through the opening 112 in a state where the cover 18 is in the opening position, and is extracted upward.

The housing 31 has a translucency that allows the ink stored in the internal space 151 to be visually recognized from the outside.

As illustrated in FIGS. 1 and 4, in the mounted state, the front wall 40 of the housing 31 faces the opening 47 formed in the front wall 44 of the lower housing 13 in the front-rear direction. Therefore, when the lower housing 13 is viewed from the front, the front wall 40 is visible through the opening 47. Further, since the front wall 40 has translucency, the ink stored in the internal space 151 is visible through the opening 47 and the front wall 40 when the lower housing 13 is viewed from the front. In the present embodiment, the ink stored in the ink cartridges 30C, 30M, and 30Y is visible through the opening 47 and the front wall 40 formed in the right end portion of the front wall 44, and the ink stored in the ink cartridge 30B is visible through the opening 47 and the front wall 40 formed in the left end portion of the front wall 44. The front wall 40 of the ink cartridge 30B is an example of a second wall. The front wall 40 of the ink cartridges 30C, 30M, and 30Y is an example of the second wall.

As illustrated in FIG. 5, in the mounted state, the rear wall 41 is between the front wall 40 and the rear wall 43 in the front-rear direction.

As illustrated in FIGS. 1 and 6A, in the mounted state, the right side wall 37 of the housing 31 faces the opening 48 formed in the right side wall 45 of the lower housing 13 in the left-right direction. Therefore, when the lower housing 13 is viewed from the right, the right side wall 37 is visible through the opening 48. Further, since the right side wall 37 has translucency, the ink stored in the internal space 151 is visible through the opening 48 and the right side wall 37 when the lower housing 13 is viewed from the right. In the present embodiment, the ink stored in the ink cartridge 30Y is visible through the opening 48 and the right side wall 37. The right side wall 37 of the ink cartridge 30Y is an example of a third wall.

As illustrated in FIG. 6B, in the mounted state, the left side wall 38 of the housing 31 faces the opening 49 formed in the left side wall 46 of the lower housing 13 in the left-right direction. Therefore, when the lower housing 13 is viewed from the left side, the left side wall 38 is visible through the opening 49. Further, since the left side wall 38 has translucency, the ink stored in the internal space 151 is visible through the opening 49 and the left side wall 38 when the lower housing 13 is viewed from the left side. In the present embodiment, the ink stored in the ink cartridge 30B is visible through the opening 49 and the left side wall 38. The left side wall 38 of the ink cartridge 30B is an example of the third wall.

In the housing 31 of the ink cartridge 30 (in the present embodiment, the ink cartridges 30C, 30M, and 30Y) mounted on the mounting unit 110A, it is sufficient that at least the front wall 40 facing the front and the right side wall 37 facing the right are translucent. In the housing 31 of the ink cartridge 30 (in the present embodiment, the ink cartridge 30B) mounted on the mounting unit 110B, it is sufficient that at least the front wall 40 facing the front and the left side wall 38 facing the left are translucent.

Further, all of the ink cartridges 30B, 30C, 30M, and 30Y may not have a translucent wall, but it is preferable that at least one of the ink cartridges 30B, 30C, 30M, and 30Y has a translucent wall. It is more preferable that all of the ink cartridges 30B, 30C, 30M, and 30Y have a translucent wall.

As illustrated in FIG. 7A, the through-hole 152 (an example of a liquid flow hole) is formed in the lower wall 42 of the housing 31. In the present embodiment, the through-hole 152 is disposed in the front portion of the ink cartridge 30. In other words, as illustrated in FIG. 8, a distance L1 between the front wall 40 and the through-hole 152 is shorter than a distance L2 between the rear wall 41 and the through-hole 152 in the front-rear direction. Further, as illustrated in FIG. 7A, the through-hole 152 is disposed on the right portion of the ink cartridge 30. In other words, as illustrated in FIG. 9, the through-hole 152 is on the right side of the center position P1 of the ink cartridge 30 in the left-right direction. The position of the through-hole 152 is not limited to the position described above. For example, the through-hole 152 may be disposed so as to overlap the center position P1 in the left-right direction of the ink cartridge 30.

As illustrated in FIG. 8, the internal space 151 communicates with the outside through the through-hole 152. The ink stored in the internal space 151 can flow to the outside through the through-hole 152. However, in the present embodiment, the through-hole 152 is closed by a seal 153 attached to the outer surface of the lower wall 42. Therefore, the flow of the ink stored in the internal space 151 to the outside is restricted.

Figure 15B:
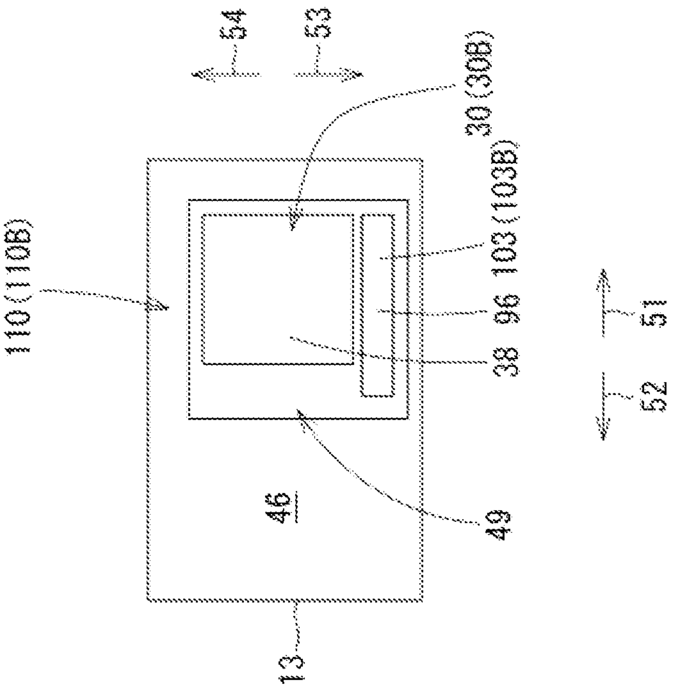
FIG. 15B is a left side view of the lower housing 13 in the modification.
Figure 15A:
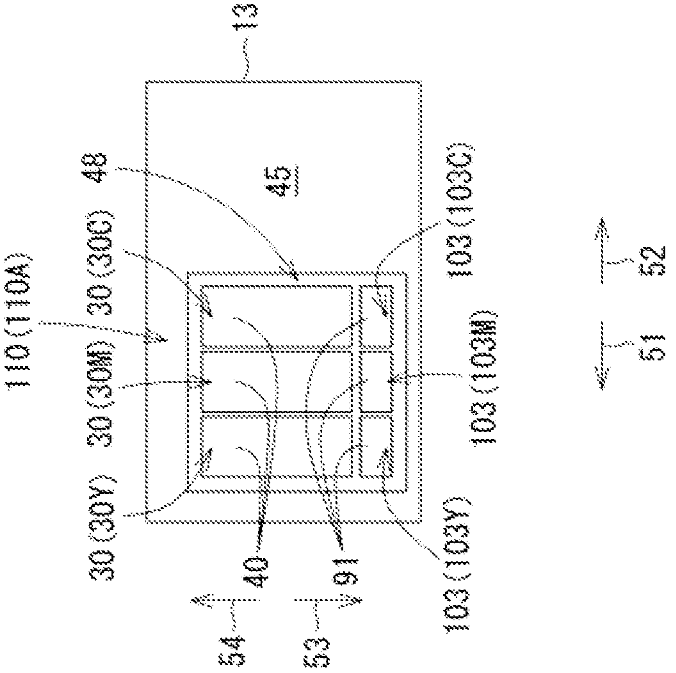
FIG. 15A is a right side view of the lower housing 13 according to the modification.
Figure 16:
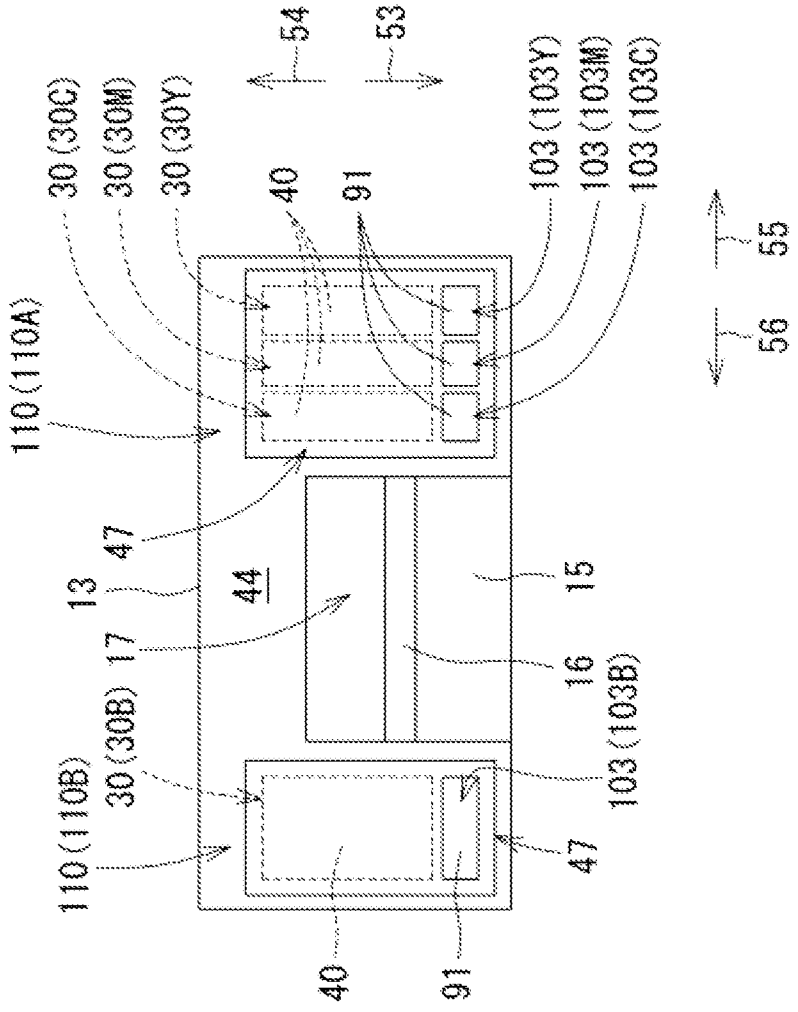
FIG. 16 is a front view of the lower housing 13 according to the modification.
Figure 17:
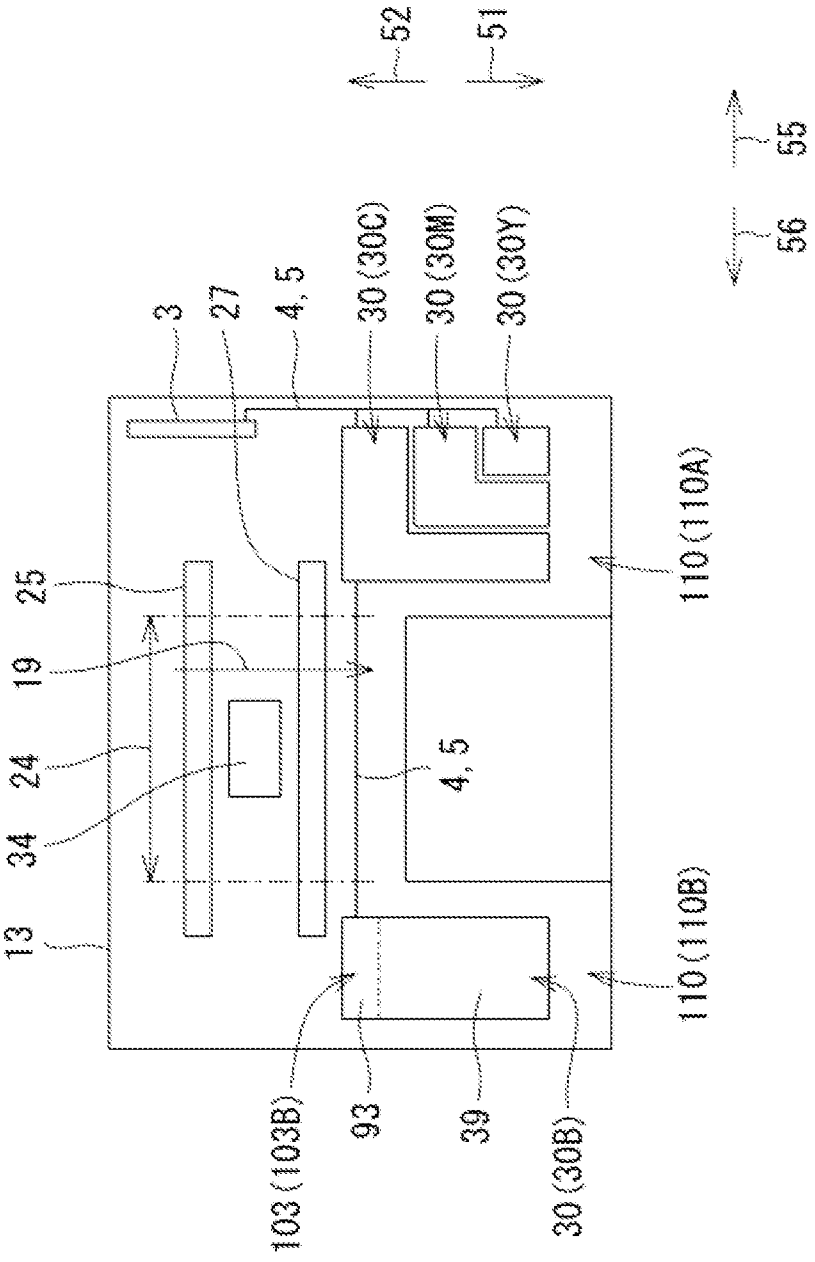
FIG. 17 is a plan view of the lower housing 13 according to the modification.
Figure 18B:
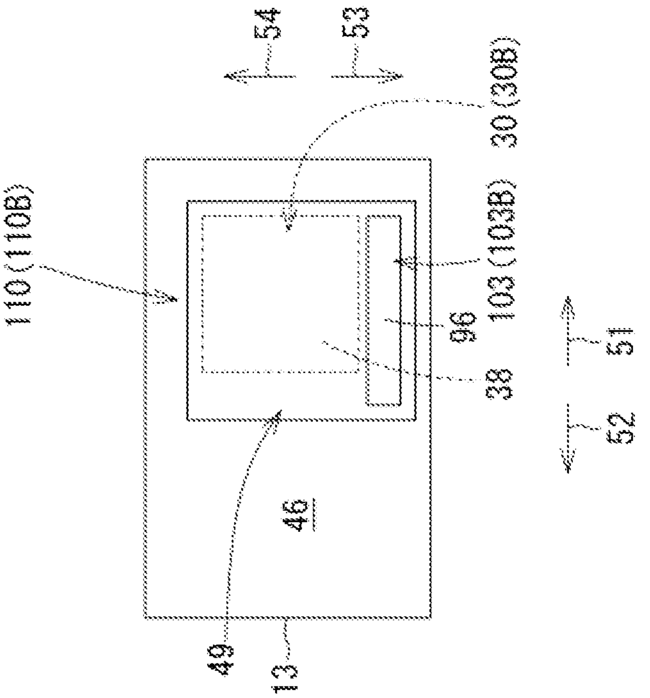
FIG. 18B is a left side view of the lower housing 13 according to the modification.
Figure 18A:
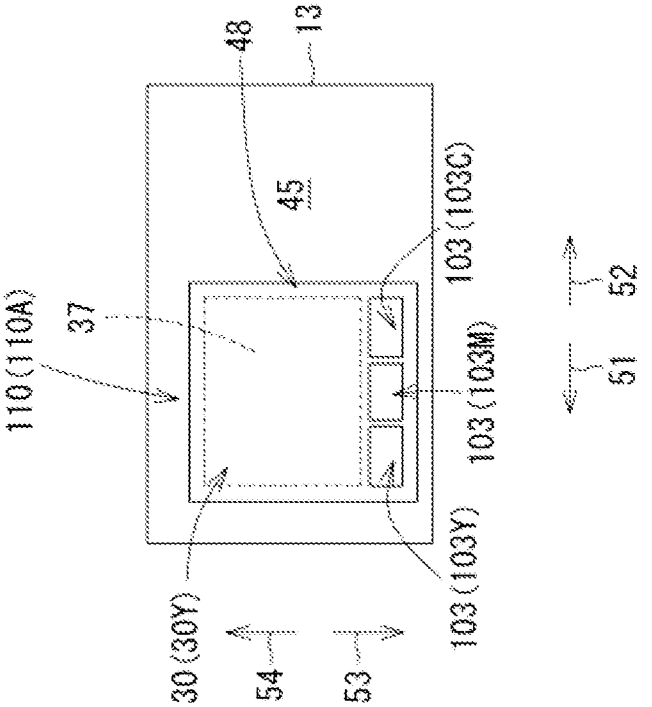
FIG. 18A is a right side view of the lower housing 13 according to the modification.

The means for closing the through-hole 152 is not limited to the seal 153. For example, a so-called duckbill type valve may be attached to the through-hole 152. The through-hole 152 may be closed by a valve having the same configuration as a described-later valve 35 having the configuration illustrated in FIGS. 15A and 15B. Further, for example, a configuration in which a movable valve disposed in the internal space 151 is urged by a coil spring to close the through-hole 152, and the valve is pushed by the flow pipe 120 and moved to open the through-hole 152 may be used.

[Protrusion 67]

As illustrated in FIGS. 7A and 8, the rear wall 41 of the housing 31 has a protrusion 67 protruding rearward. The protrusion 67 extends in the vertical direction.

The right surface or the left surface of the protrusion 67 is a surface on which light emitted by the optical sensor 113 of the mounting unit 110 hits. In the present embodiment, the protrusion 67 is a resin plate including a color material (black pigment) that can block or attenuate light, for example. As another form, a material that does now allow the light to transmit, such as an aluminum foil, may be attached to at least the light blocking surface of the protrusion 67.

[Circuit Board 64]

As illustrated in FIGS. 7A and 8, the circuit board 64 is attached to the rear wall 41 of the housing 31. The circuit board 64 is below the protrusion 67. In the present embodiment, the circuit board 64 is disposed on the left side of the ink cartridge 30. In other words, as illustrated in FIG. 9, the circuit board 64 is on the left side of the center position P1 of the ink cartridge 30 in the left-right direction. The position of the through-hole 152 is not limited to the position described above. The position of the circuit board 64 is not limited to a position below the protrusion 67.

As illustrated in FIGS. 7A and 8, the circuit board 64 includes a substrate 63, a memory (not illustrated), and the electrode 65.

In the present embodiment, the circuit board 64 is provided only in the ink cartridge 30B among the ink cartridges 30B, 30C, 30M, and 30Y. That is, the circuit board 64 is not provided in the ink cartridges 30C, 30M, and 30Y. However, the circuit board 64 may be provided in at least one of the ink cartridges 30C, 30M, and 30Y.

The circuit board 64 is obtained by mounting a memory on the substrate 63 that is a rigid substrate formed of glass epoxy or the like and forming four electrodes 65 (an example of a reservoir side contact). The number of electrodes 65 is determined according to the number of contacts 132 of the mounting unit 110 and is not limited to four.

The memory is mounted on the back surface of the substrate 63 (the surface facing the rear wall 41). In the present embodiment, when the substrate 63 is attached to the rear wall 41, a recess (not illustrated) that can accommodate the memory is formed at a position corresponding to the memory in the rear wall 41. The memory mounting position is not limited to the back surface of the substrate 63.

Information regarding the ink cartridge 30 is stored in the memory so that the controller 1 (see FIG. 3) of the multi-function device 10 can read out the stored information. The information regarding the ink cartridge 30 is data indicating information such as a lot number, a manufacturing date, an ink color, and the like. In addition, information related to the amount of the ink stored in the ink cartridge 30 such as the consumed amount of the ink may be stored. The memory is a semiconductor memory such as a nonvolatile memory such as FRAM (registered trademark) or a volatile memory such as SRAM.

Each of the four electrodes 65 corresponds to each of the four contacts 132 of the mounting unit 110. As illustrated in FIGS. 7A and 9, the four electrodes 65 are exposed to be electrically connectable. Each electrode 65 extends along the vertical direction. The electrodes 65 are arranged apart in the left-right direction. Each electrode 65 is electrically connected to the memory.

[Protrusion 70]

As illustrated in FIG. 8, the protrusion 70 protrudes forward from the front wall 40 of the housing 31. In the mounted state, when the stopper 131 of the mounting unit 110 is in the holding position, the protrusion 70 is immediately below the stopper 131. At this time, the stopper 131 restricts the ink cartridge 30 from being extracted from the mounting unit 110. In the mounted state, when the stopper 131 of the mounting unit 110 is in the release position, the protrusion 70 is at a position different from the stopper 131 in the left-right direction. At this time, the ink cartridge 30 can be extracted from the mounting unit 110 without being restricted by the stopper 131. The protrusion 70 provided in the ink cartridge 30B is an example of the first holding mechanism. The protrusions 70 included in the ink cartridges 30C, 30M, and 30Y are an example of the second holding mechanism.

Instead of sliding the stopper 131, the ink cartridge 30 may be moved in the left-right direction or rotated. The configuration may be used in which by moving or rotating the ink cartridge 30, the protrusion 70 and the stopper 131 become in a positional relationship displaced from the position where the protrusion 70 and the stopper 131 vertically overlap each other, and thus, the ink cartridge 30 can be extracted from the mounting unit 110 without being restricted by the stopper 131.

Further, the ink cartridge 30 may not include the protrusion 70. In this case, for example, when the stopper 131 at the holding position comes into contact with the upper wall 39 of the ink cartridge 30, the stopper 131 may restrict the extraction of the ink cartridge 30 from the mounting unit 110.

[Operation for Mounting Ink Cartridge 30 on Mounting Unit 110]

Hereinafter, the operation for mounting the ink cartridge 30 on the holder 101 of the mounting unit 110 will be described.

As illustrated in FIG. 7A, in the ink cartridge 30 that is not mounted on the mounting unit 110, since the through-hole 152 is sealed with the seal 153, the ink stored in the internal space 151 is prevented from flowing out to the outside.

Further, in the mounting unit 110 where the ink cartridge 30 is not mounted, there is no other member between the light emitting portion and the light receiving portion of the optical sensor 113. Therefore, light can travel from the light emitting portion to the light receiving portion. At this time, the optical sensor 113 outputs a high-level detection signal to the controller 1 (see FIG. 3). When the controller 1 receives the high-level detection signal from the optical sensor 113, the controller 1 determines that the ink cartridge 30 is not mounted on the mounting unit 110.

Further, the stopper 131 is at the release position in the mounting unit 110 where the ink cartridge 30 is not mounted.

First, the upper housing 14 (see FIG. 1) is rotated from the covering position to the opening position. Thus, the upper end of the lower housing 13 is opened, and the cover 18 is exposed. Next, the cover 18 is rotated from the covering position to the opening position. Thus, the opening 112 is exposed.

The ink cartridge 30 is inserted into the internal space 108 of the holder 101 from above the holder 101 through the opening 112. In the present embodiment, the ink cartridge 30 is inserted downward into the holder 101. However, the present invention is not limited thereto, and the ink cartridge 30 may be inserted into the holder 101 in a direction inclined downward in the vertical direction (in a diagonally downward direction).

As illustrated in FIG. 8, when the ink cartridge 30 is inserted into the holder 101, the flow pipe 120 breaks through the seal 153 from the lower side of the ink cartridge 30 and penetrates the through-hole 152 to enter the internal space 151 of the ink cartridge 30. That is, the flow pipe 120 is connected to the through-hole 152. As a result, the ink stored in the internal space 151 can flow into the internal space 119 of the tank 103 via the flow pipe 120.

A ring member (not illustrated) made of an elastic body such as rubber is attached to the peripheral edge of the through-hole 152. The ring member is in liquid-tight contact with the outer peripheral surface of the flow pipe 120 that penetrates the through-hole 152.

Further, when the ink cartridge 30 is inserted into the holder 101, the protrusion 67 is positioned between the light emitting portion and the light receiving portion of the optical sensor 113. Accordingly, the protrusion 67 blocks light from traveling from the light emitting portion to the light receiving portion. At this time, the optical sensor 113 outputs a low-level detection signal to the controller 1 (see FIG. 3). When the controller 1 receives the low-level detection signal from the optical sensor 113, the controller 1 determines that the ink cartridge 30 is mounted on the mounting unit 110.

When the ink cartridge 30 is inserted into the holder 101, each electrode 65 of the circuit board 64 comes into contact with the corresponding contact 132 from the front. When each electrode 65 comes into contact with the corresponding contact 132 and becomes conductive, a voltage Vc is applied to the electrode 65, or the electrode 65 is grounded, or power is supplied to the electrode 65. Further, due to the conduction between the contact 132 and the electrode 65, the memory mounted on the circuit board 64 is conducted with the controller 1 (see FIG. 3). As a result, the controller 1 can access the memory. As a result, the data stored in the memory is input to the controller 1.

Further, after the ink cartridge 30 is inserted into the holder 101, the stopper 131 is moved from the release position to the holding position. As a result, the ink cartridge 30 is held in a state of being mounted on the mounting unit 110. Thereafter, the cover 18 is rotated from the opening position to the covering position, and the upper housing 14 is rotated from the opening position to the covering position.

When the ink cartridge 30 is extracted from the holder 101, the upper housing 14 is rotated from the covering position to the opening position, and the cover 18 is rotated from the covering position to the opening position. Thereafter, the stopper 131 is moved from the holding position to the release position. As a result, the ink cartridge 30 can be extracted from the mounting unit 110 without being restricted by the stopper 131. Next, the user grasps the ink cartridge 30 and pulls the ink cartridge 30 upward. As a result, the flow pipe 120 is removed from the through-hole 152, and the ink cartridge 30 is extracted from the holder 101.

Hereinafter, the supply of ink from the ink cartridge 30 to the tank 103 in the mounted state illustrated in FIG. 8 will be described. In the present embodiment, the ink is supplied from the ink cartridge 30 to the tank 103 by a so-called chicken feed method as described in detail below.

When the ink cartridge 30 is connected to the tank 103 and the openings 125B and 126B of the flow pipe 120 are positioned in the internal space 151 of the ink cartridge 30, the internal space 151 and the internal space 119 of the tank 103 are communicated through the first flow path 125 and the second flow path 126. As a result, as indicated by the dashed-dotted arrow in FIG. 8, the ink stored in the internal space 151 flows through the opening 126B into the second flow path 126 and flows from the opening 126A of the second flow path 126 into the internal space 119. Further, during the circulation of the ink, as indicated by broken-line arrows in FIG. 8, air enters the internal space 119 from the air communication hole 124 and flows into the internal space 151 from the first flow path 125 through the opening 125B. Here, the volume of ink flowing from the ink cartridge 30 into the tank 103 and the volume of air flowing from the tank 103 into the ink cartridge 30 are substantially the same. In this way, so-called gas-liquid replacement is performed.

When ink flows into the internal space 119 and the liquid level of the ink in the internal space 119 rises and reaches the opening 125A of the first flow path 125, the flow of the air between the first flow path 125 and the internal space 151 is blocked. Thus, the flow of air from the internal space 119 into the internal space 151 is stopped. Therefore, the flow of ink from the internal space 151 into the internal space 119 is stopped.

Effect 1 of Embodiment

When the ink cartridge 30 is connected to the tank 103, the front wall 40 is visible from the outside of the lower housing 13 through the opening 47 formed in the front wall 44 of the lower housing 13. According to the present embodiment, the circuit board 64 is disposed on the rear wall 41. Thus, it is not necessary to arrange a mechanism such as the contact 132 that is conducted to the circuit board 64, with the ink cartridge 30 in the left-right direction. Therefore, it is possible to suppress an increase in the size of the lower housing 13 in the left-right direction due to the circuit board 64 being disposed.

Further, according to the present embodiment, the ink cartridge 30 is connected to the tank 103 from above the lower housing 13. That is, the through-hole 152 of the ink cartridge 30 is formed in the lower wall 42 of the ink cartridge 30. The rear wall 41 on which the circuit board 64 is disposed is not a wall facing downward in the ink cartridge 30. Therefore, when the ink cartridge 30 is connected to the tank 103 and when the connection is released, the possibility that the ink stored in the ink cartridge 30 and the tank 103 adheres to the circuit board 64 can be reduced.

According to the present embodiment, the through-hole 152 is located closer to the front wall 40 than to the rear wall 41 in the front-rear direction. Therefore, the distance between the through-hole 152 and the rear wall 41 can be lengthened. Therefore, when the ink cartridge 30 is connected to the tank 103 and when the connection is released, the possibility that the ink stored in the ink cartridge 30 and the tank 103 adheres to the circuit board 64 can be reduced.

According to the present embodiment, the through-hole 152 is on the right side of the center position P1 of the ink cartridge 30. The circuit board 64 is on the left side of the center position P1 of the ink cartridge 30. Thus, the distance between the through-hole 152 and the circuit board 64 in the left-right direction can be lengthened. Therefore, when the ink cartridge 30 is connected to the tank 103 and when the connection is released, the possibility that the ink stored in the ink cartridge 30 and the tank 103 adheres to the circuit board 64 can be reduced.

According to the present embodiment, the remaining amount of the ink stored in the tank 103 can be confirmed from the front.

According to the present embodiment, the liquid ink stored in the ink cartridge 30 can be confirmed not only from the front but also from the side.

According to the present embodiment, the remaining amount of the ink stored in the tank 103 can be confirmed not only from the front but also from the side.

Effect 2 of Embodiment

According to the present embodiment, the tank 103B and the tanks 103C, 103M, and 103Y are arranged separately on the left and right sides of the conveyance path 24. Therefore, the size of each tank 103 can be enlarged, compared with the configuration in which all the tanks 103 are arranged only on one side of the conveyance path 24 in the left-right direction.

According to the present embodiment, the ink cartridge 30 is connected to the tank 103 from above. Therefore, the possibility that the ink cartridge 30 will accidentally come out of the tank 103 can be reduced, compared with the embodiment in which the ink cartridge 30 is connected to the tank 103 along the horizontal direction.

According to the present embodiment, the ink cartridge 30 is connected to the tank 103 from above. Therefore, the ink cartridge 30 is above the tank 103. Therefore, it is easy to use up the ink stored in the ink cartridge 30.

Normally, the user stands in front of the lower housing 13 and takes out the discharged sheet 2. According to the present embodiment, the remaining amount of the ink stored in the tank 103 can be confirmed from the front of the lower housing 13 through the front wall 91.

Normally, the user stands in front of the lower housing 13 and takes out the discharged sheet 2. According to the embodiment, the remaining amount of the ink stored in the ink cartridge 30 can be confirmed from the front of the lower housing 13 through the front wall 40.

According to the present embodiment, the remaining amount of the ink stored in the tank 103 can be confirmed through the right side wall 95 and the left side wall 96 from the side in addition to the front.

According to the present embodiment, the remaining amount of the ink stored in the ink cartridge 30 can be confirmed through the right side wall 37 and the left side wall 38 from the side in addition to the front.

According to the present embodiment, it is easy to configure the tanks 103 arranged in parallel along the left-right direction so as to be visible from the front.

According to the present embodiment, it is easy to configure the ink cartridges 30 arranged in parallel along the left-right direction so as to be visible from the front.

According to the present embodiment, for example, it is sufficient that a mechanism necessary only for the ink having the first specific gravity (for example, a pigment stirring mechanism that is necessary when the ink having the first specific gravity is a pigment) is only near the tank 103B. That is, the mechanism does not need to be disposed near the tanks 103C, 103M, and 103Y. Therefore, the tanks 103C, 103M, and 103Y can be enlarged.

According to the present embodiment, when the ink stored in the tank 103 is consumed and the liquid level of the ink becomes lower than the opening 125A at the lower end of the first flow path 125 in the mounted state, the air enters the tank 103 from the air communication hole 124 and enters the ink cartridge 30 through the first flow path 125. Then, the ink corresponding to the volume of the air that has entered the ink cartridge 30 is supplied from the ink cartridge 30 into the tank 103 through the second flow path 126. When the liquid level of the ink in the tank 103 reaches the opening 125A of the first flow path 125, the ink supply is stopped. Thus, the liquid level of the ink stored in the tank 103 can be kept constant.

According to the present embodiment, the ink cartridge 30 connected to the tank 103 can be protected by the cover 18.

According to the present embodiment, the protrusion 70 and the stopper 131 can prevent the ink cartridge 30 from being unintentionally detached from the tank 103.

[Modification 1]

In the above embodiment, the circuit board 64 is disposed on the rear wall 41. However, the circuit board 64 may be disposed on other than the rear wall 41. In the following modification, only the configuration different from the above embodiment will be described, and the description of the same configuration as the above embodiment will be omitted.

Figure 10:
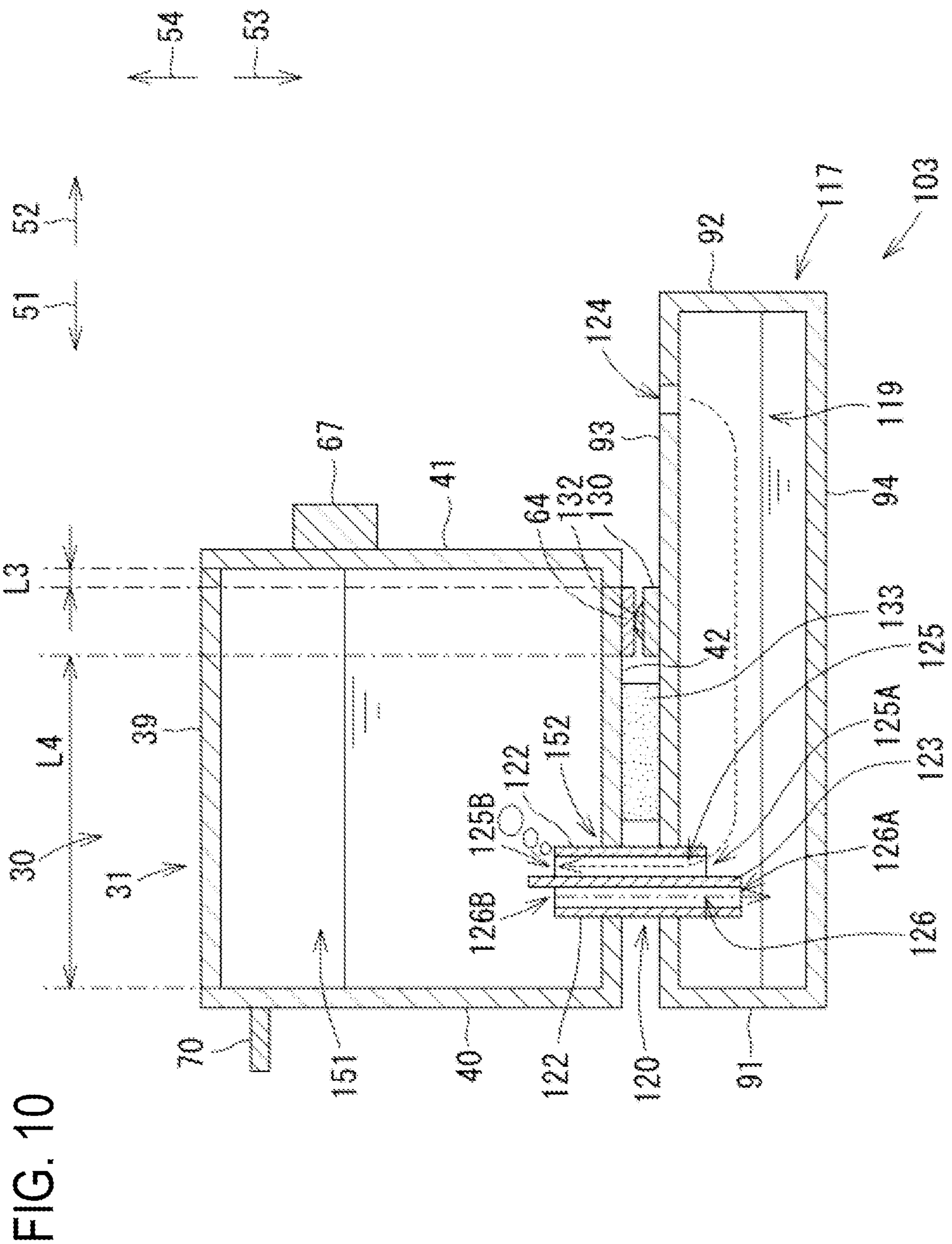
FIG. 10 is a longitudinal cross-sectional view around the ink cartridge 30 in a mounted state according to a modification.

As illustrated in FIG. 10, the circuit board 64 may be disposed on the lower wall 42. In the modification illustrated in FIG. 10, the circuit board 64 is disposed in the rear portion of the lower wall 42. In other words, a distance L3 between the rear wall 41 and the circuit board 64 is shorter than a distance L4 between the front wall 40 and the circuit board 64 in the front-rear direction. In the modification illustrated in FIG. 10, the circuit board 64 is disposed in the left portion of the ink cartridge 30 and the through-hole 152 is disposed in the right portion of the ink cartridge 30, as in the above embodiment.

In the modification illustrated in FIG. 10, an absorber 133 that absorbs ink is disposed between the flow pipe 120 and the circuit board 64 in the front-rear direction in the mounted state. The absorber 133 is made of a porous material such as polyurethane foam. In the present embodiment, the absorber 133 is supported by the upper wall 93. The arrangement position of the absorber 133 is not limited to the upper wall 93, and may be attached to the lower wall 42 of the ink cartridge 30, for example.

The lower wall 42 is a wall facing downward when the ink cartridge 30 is connected to the tank 103. According to the modification illustrated in FIG. 10, the circuit board 64 is disposed on the lower wall 42. Thus, it is not necessary to arrange a mechanism such as the contact 132 that is conducted to the circuit board 64, with the ink cartridge 30 in the left-right direction. Therefore, the increase in the size of the lower housing 13 in the left-right direction due to the circuit board 64 can be suppressed.

Figure 14:
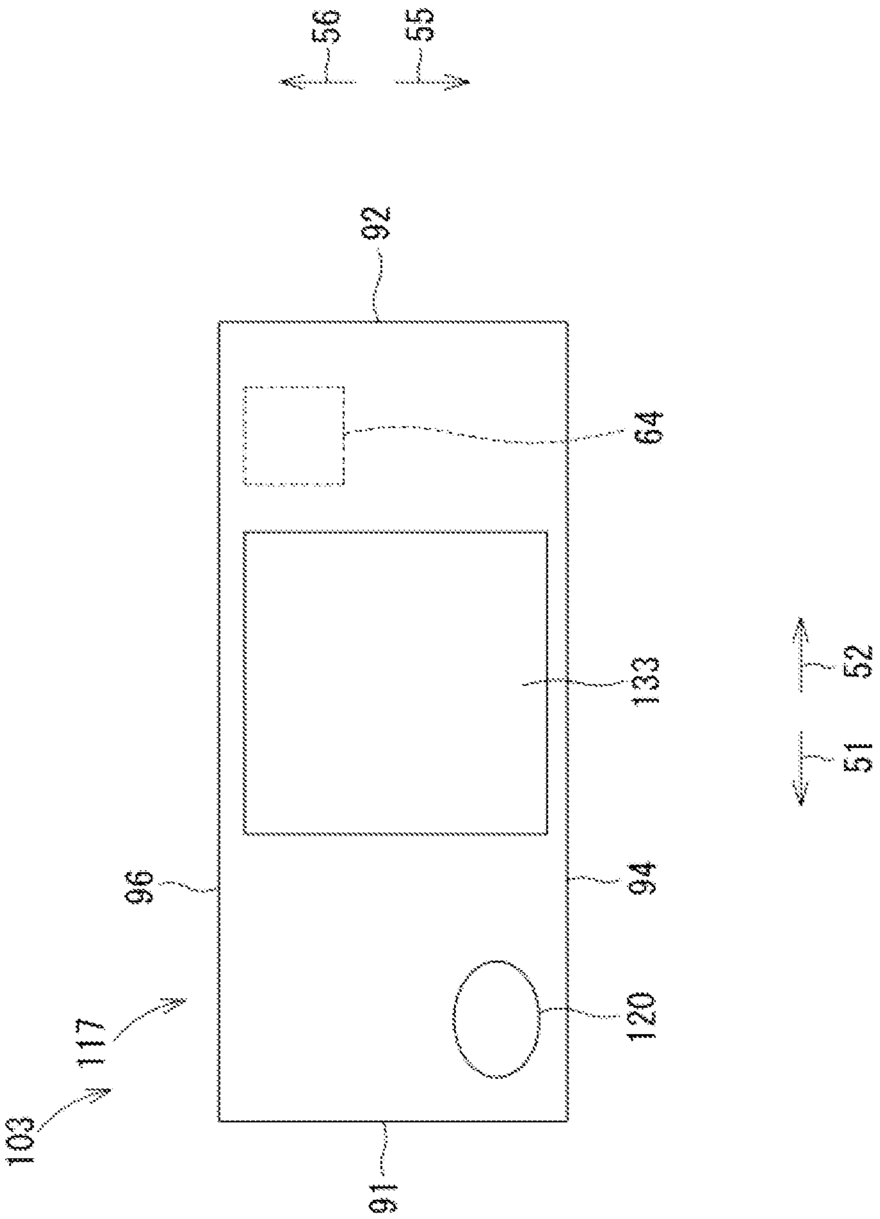
FIG. 14 is a plan view of the lower housing 13 according to the modification.

According to the modification illustrated in FIG. 10, the absorber 133 is disposed between the flow pipe 120 and the circuit board 64. As a result, as illustrated in FIG. 14, the ink flow path from the connection location (near the flow pipe 120) between the ink cartridge 30 and the tank 103 to the circuit board 64 is blocked by the absorber 133. Therefore, when the ink stored in the ink cartridge 30 and the tank 103 flows toward the circuit board 64, the ink is absorbed by the absorber 133. Thus, the adhesion of the ink to the circuit board 64 can be reduced. In FIG. 14, the circuit board 64 is illustrated in order to illustrate the positional relationship with respect to the tank 103, but since the circuit board 64 is not provided in the tank 103, the circuit board 64 is illustrated by a broken line.

Figure 11:
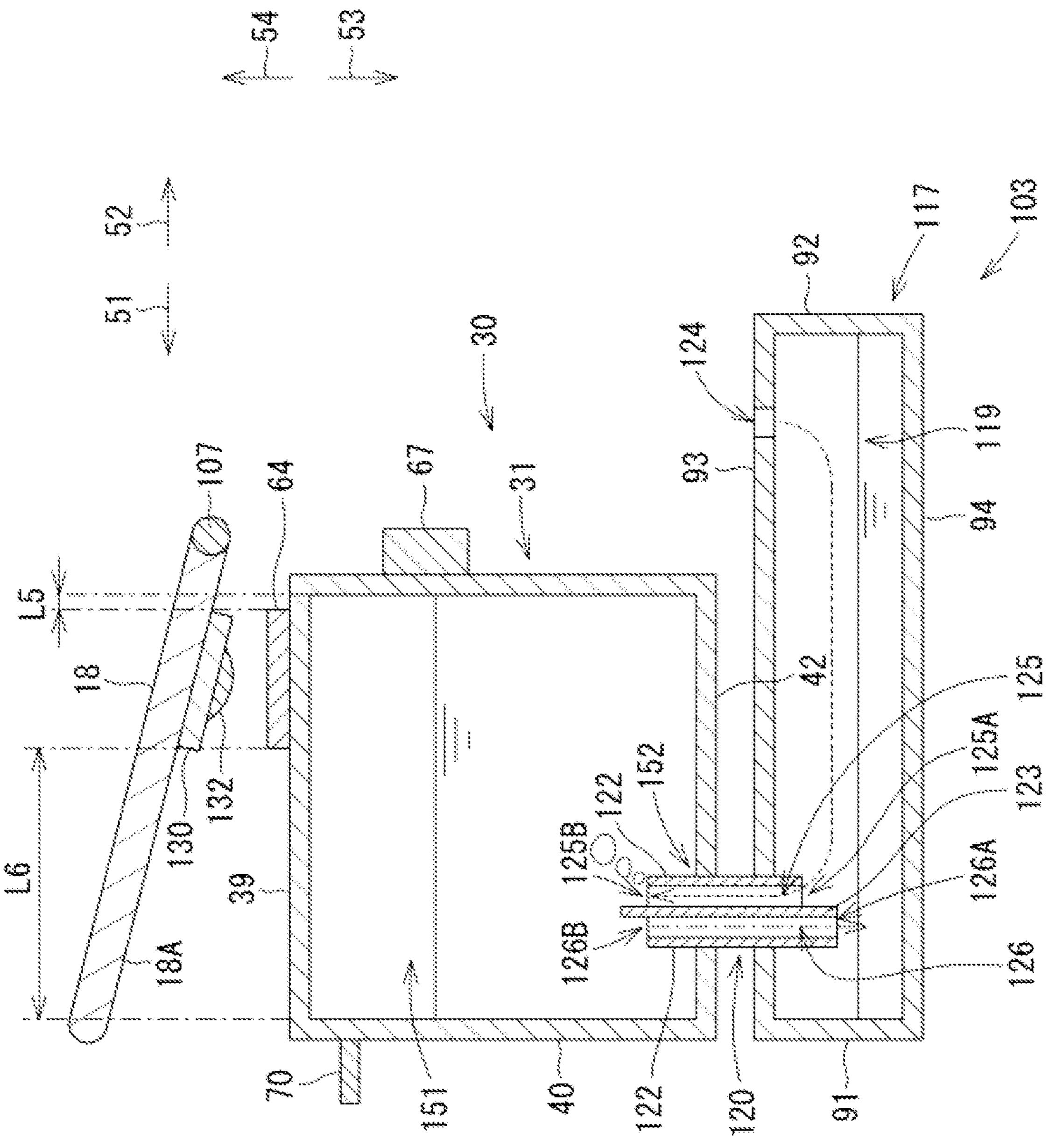
FIG. 11 is a longitudinal cross-sectional view around the ink cartridge 30 in a mounted state according to the modification, and illustrates a state in which a cover 18 is in an opening position.

As illustrated in FIG. 11, the circuit board 64 may be disposed on the upper wall 39. In the modification illustrated in FIG. 11, the circuit board 64 is disposed in the rear portion of the upper wall 39. In other words, a distance L5 between the rear wall 41 and the circuit board 64 is shorter than a distance L6 between the front wall 40 and the circuit board 64 in the front-rear direction. In the modification illustrated in FIG. 11, the circuit board 64 is disposed in the left portion of the ink cartridge 30 and the through-hole 152 is disposed in the right portion of the ink cartridge 30 as in the above embodiment.

Figure 12:
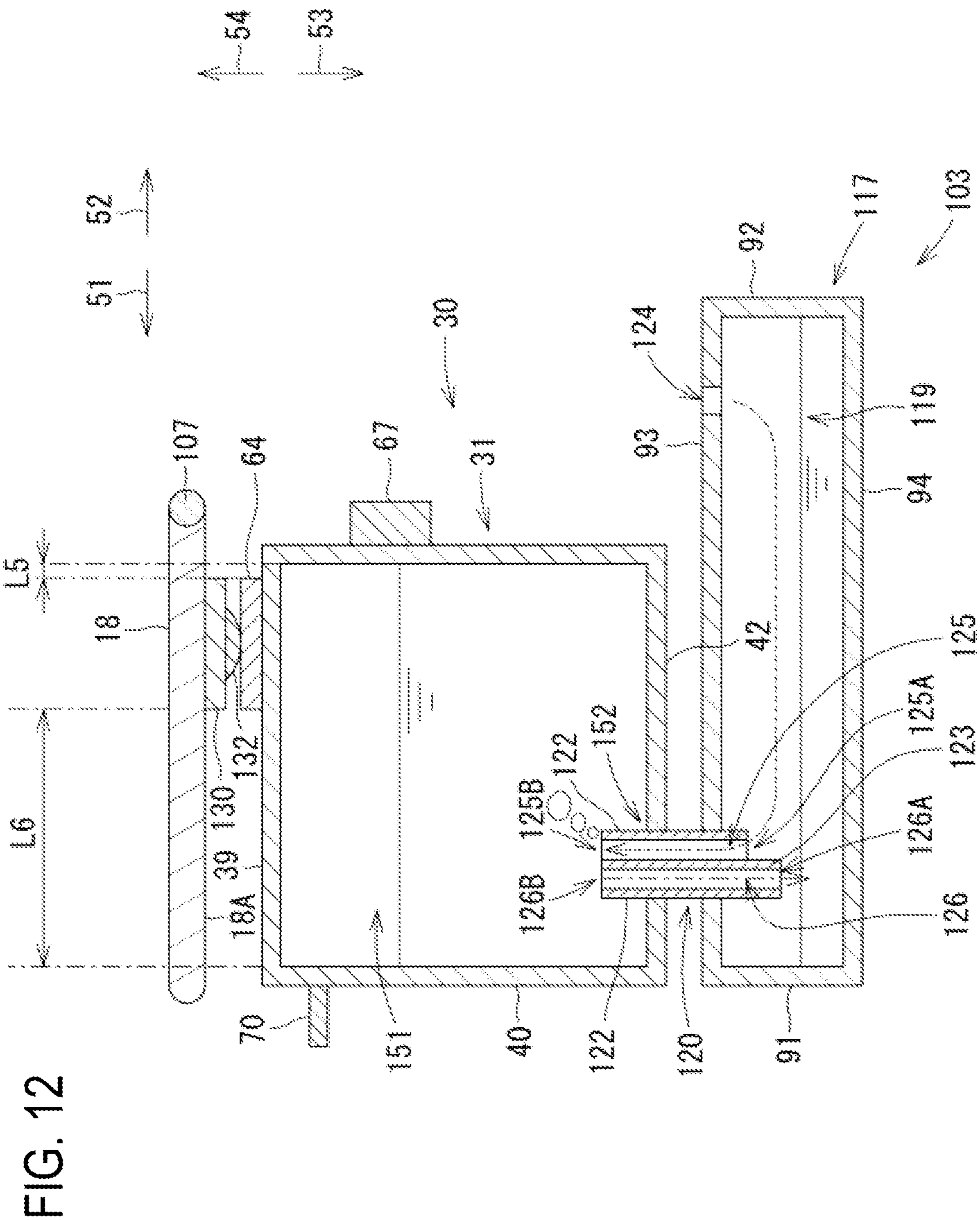
FIG. 12 is a longitudinal cross-sectional view around the ink cartridge 30 in a mounted state according to a modification, and illustrates a state in which the cover 18 is in a covering position.

In the modification illustrated in FIG. 11, the connector 130 is attached to the lower surface 18A of the cover 18. As illustrated in FIG. 12, in the mounted state, when the cover 18 is in the covering position, the contact 132 is in contact with the electrode 65 of the circuit board 64 from above. On the other hand, as illustrated in FIG. 11, when the cover 18 is in the opening position in the mounted state, the contact 132 is separated from the electrode 65 of the circuit board 64.

The upper wall 39 is a wall facing upward when the ink cartridge 30 is connected to the tank 103. According to the modification illustrated in FIG. 11, the circuit board 64 is disposed on the upper wall 39. Thus, it is not necessary to arrange a mechanism such as the contact 132 that is conducted to the circuit board 64, with the ink cartridge 30 in the left-right direction. Therefore, it is possible to suppress an increase in the size of the lower housing 13 in the left-right direction due to the circuit board 64 being disposed.

Further, according to the modification illustrated in FIG. 11, the ink cartridge 30 is connected to the tank 103 from above the lower housing 13. That is, the through-hole 152 of the ink cartridge 30 is formed in the lower wall 42 of the ink cartridge 30. The upper wall 39 on which the circuit board 64 is disposed is not a wall facing downward in the ink cartridge 30. Therefore, when the ink cartridge 30 is connected to the tank 103 and when the connection is released, the possibility that the ink stored in the ink cartridge 30 and the tank 103 adheres to the circuit board 64 can be reduced.

According to the modification illustrated in FIG. 11, by detecting the contact between the contact 132 and the electrode 65, it is possible to detect that the ink cartridge 30 is connected to the tank 103 and that the cover 18 has moved to the covering position. That is, it is not necessary to separately provide a sensor for detecting that the ink cartridge 30 is connected to the tank 103 and a sensor for detecting that the cover 18 has moved to the covering position.

In the embodiment and the modification, only the ink cartridge 30B includes the circuit board 64. However, as described above, the other ink cartridges 30C, 30M, and 30Y may include the circuit board 64. In this case, the arrangement of the circuit board 64 described in the above embodiment and the modification can be applied to the arrangement of the circuit board 64 provided in the ink cartridges 30C, 30M, and 30Y.

In the above embodiment, the ink supply from the ink cartridge 30 to the tank 103 is performed by the chicken feed method, but may be performed by a method other than the chicken feed method. For example, the supply of ink from the ink cartridge 30 to the tank 103 may be performed by a water head difference between the liquid level of the ink stored in the internal space 151 of the ink cartridge 30 and the liquid level of the ink stored in the internal space 119 of the tank 103. In this case, an air release hole is formed in the housing 31 of the ink cartridge 30 to open the air by communicating the internal space 151 with the outside.

In the above embodiment, the ink stored in the ink cartridge 30 and the tank 103 is visible through the opening 47 that is an example of the first translucent portion formed in the lower housing 13 and the openings 48 and 49 that are examples of the second translucent portion. However, the means for visually recognizing the ink stored in the ink cartridge 30 and the tank 103 is not limited to the openings 47, 48, and 49 as long as the means has translucency. For example, a transparent plate may be attached to the openings 47, 48, and 49. In this case, since the plate has translucency, the ink stored in the ink cartridge 30 and the tank 103 is visible through the plate. The plate provided on the front wall 44 is an example of the first translucent portion. The plates provided on the right side wall 45 and the left side wall 46 are examples of the second translucent portion.

In the above embodiment, the cover 18 corresponds to the cover. However, the multifunction device 10 may not include the cover 18. In this case, instead of the cover 18, the upper housing 14 may function as a cover.

In the above embodiment, the upper housing 14 and the cover 18 are moved to the covering position and the opening position by rotation, but may be moved to the covering position and the opening position by other than rotation (for example, sliding back and forth).

In the above embodiment, the ink cartridge 30 provided with the circuit board 64 and the protrusion 67 is connected to the tank 103, but the reservoir connected to the tank 103 is not limited to the ink cartridge 30. For example, a bottle that does not include the circuit board 64 or the protrusion 67 may be connected to the tank 103 as a reservoir. In this case, the means for flowing the ink stored in the bottle into the tank 103 may be a means based on the chicken feed method as described above, a means based on a water head difference, or other means (for example, a means for flowing the ink stored in the bottle into the tank 103 by pumping the bottle).

The shape of the reservoir may be a rectangular parallelepiped like the ink cartridge 30 or may be other shapes. For example, the bottle may be configured in a cylindrical shape. Further, the shape of the tank 103 is not limited to a rectangular parallelepiped.

In the above-described embodiment, ink is described as an example of liquid. However, instead of ink, for example, a pretreatment liquid ejected onto the sheet or the like prior to ink at the time of printing may be stored in a liquid cartridge. Further, water for cleaning the recording head 21 may be stored in the liquid cartridge.

[Modification]

In the above embodiment, the tank 103 is disposed in parallel along the left-right direction in the internal space 108 of the holder 101. However, the arrangement of the tanks 103 is not limited to the parallel arrangement along the left-right direction.

Figure 13:
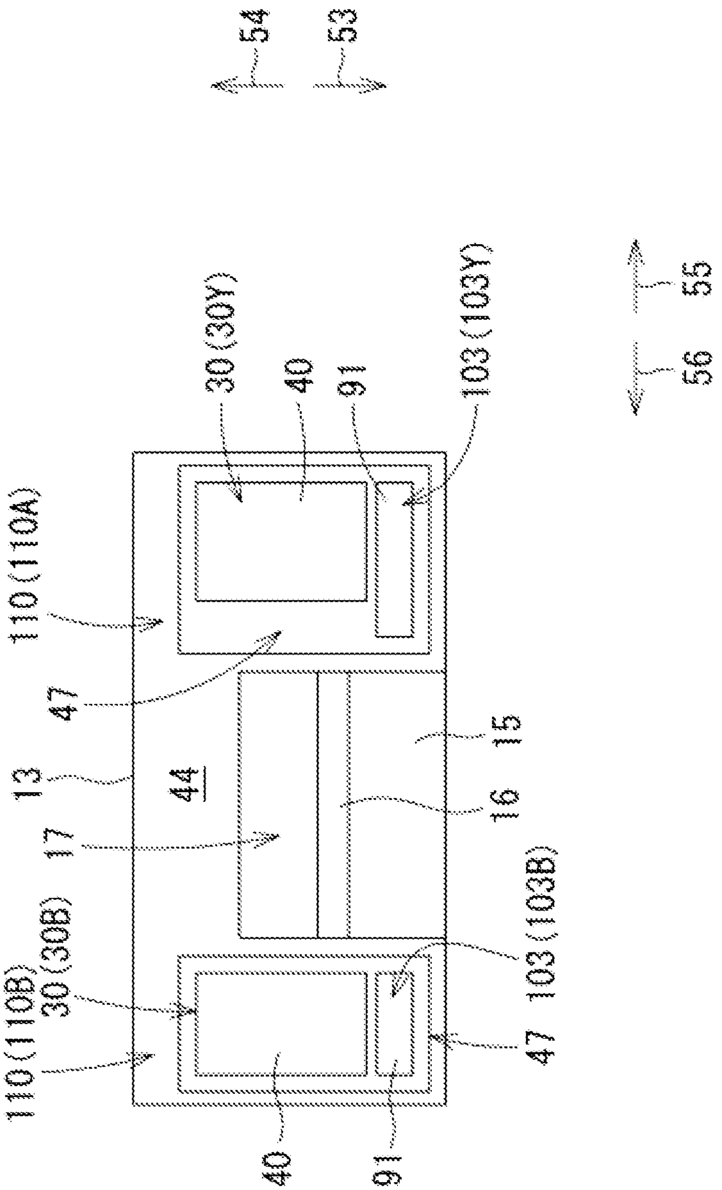
FIG. 13 is a plan view of a tank 103 according to the modification.

For example, as illustrated in FIGS. 11 to 13, in the internal space 108 of the holder 101 of the mounting unit 110A, the tanks 103 and the ink cartridges 30 may be disposed in parallel along the front-rear direction.

In this case, the front wall 91 of the tank 103Y and the front wall 40 of the ink cartridge 30Y are visible through the opening 47 formed in the right end portion of the front wall 44 of the lower housing 13. Further, the ink stored in the tank 103Y is visible through the opening 47 and the front wall 91, and the ink stored in the ink cartridge 30Y is visible through the opening 47 and the front wall 40.

Further, the right side wall 95 of the tanks 103C, 103M, and 103Y and the right side wall 37 of the ink cartridges 30C, 30M, and 30Y are visible through the opening 48 formed in the right side wall 45 of the lower housing 13. Further, the ink stored in the tanks 103C, 103M, and 103Y is visible through the opening 48 and the right side wall 95, and the ink stored in the ink cartridges 30C, 30M, and 30Y is visible through the opening 48 and the right side wall 37.

Thus, the user can recognize that the liquid level of the ink has approached the vicinity of the lower end of the ink cartridge 30 and the replacement time of the ink cartridge 30 has approached. Further, since the liquid level in the tank 103 is also visible, it can be recognized that some printing is still possible even if the ink in the ink cartridge 30 runs out. Further, when the liquid level of the tank 103 is approaching the lower end, it means that the ink in the ink cartridge has been used up. The user can recognize the necessity of replacement of the ink cartridge (ink replenishment) when the liquid level of the tank 103 approaches the lower end.

When the plurality of tanks 103 and the plurality of ink cartridges 30 are arranged in the mounting unit 110B, the plurality of tanks 103 and the plurality of ink cartridges 30 may also be arranged in parallel along the front-rear direction.

According to the modifications illustrated in FIGS. 13 to 15B, it is easy to configure the ink cartridges 30 and the tanks 103 arranged in parallel along the front-rear direction so as to be visible from the side.

Moreover, the shape of each tank 103 is not necessarily the same, and may be different. For example, the tanks 103C, 103M, and 103Y may be configured as illustrated in FIGS. 16 to 18B. The tank 103Y has a rectangular parallelepiped shape. The tank 130M is L-shaped in plan view, is larger than the tank 103Y, and is arranged from the left to the rear of the tank 103Y. The tank 130C has an L shape in plan view, is larger than the tank 103M, and is arranged from the left to the rear of the tank 103M.

In the configuration illustrated in FIGS. 16 to 18B, the front wall 91 of the tanks 103C, 103M, and 103Y is visible through the opening 47 formed in the right end portion of the front wall 44 of the lower housing 13. Further, the ink stored in the tanks 103C, 103M, and 103Y is visible through the opening 47 and the front wall 91.

Further, the right side walls 95 of the tanks 103C, 103M, and 103Y are visible through the opening 48 formed in the right side wall 45 of the lower housing 13. Further, the ink stored in the tanks 103C, 103M, and 103Y is visible through the opening 48 and the right side wall 95.

In the configuration illustrated in FIGS. 16 to 18B, the ink cartridges 30 are arranged in parallel along the left-right direction, as in the above-described embodiment (see FIGS. 4 to 6). Of course, the configuration of each ink cartridge 30 is not limited to the parallel arrangement along the left-right direction. For example, the ink cartridges 30C, 30M, and 30Y may be configured in the same shape as the tanks 103C, 103M, and 103Y illustrated in FIGS. 12 to 14.

In the above embodiment, the ink supply from the ink cartridge 30 to the tank 103 is performed by the chicken feed method, but may be performed by a method other than the chicken feed method. For example, the supply of ink from the ink cartridge 30 to the tank 103 may be performed by a water head difference between the liquid level of the ink stored in the internal space 151 of the ink cartridge 30 and the liquid level of the ink stored in the internal space 119 of the tank 103 as described in detail with reference to FIGS. 15A and 15B. In the following description, a portion having a configuration different from that of the above embodiment will be described, and the description of a portion having the same configuration as that of the above embodiment will be omitted.

Figure 19A:
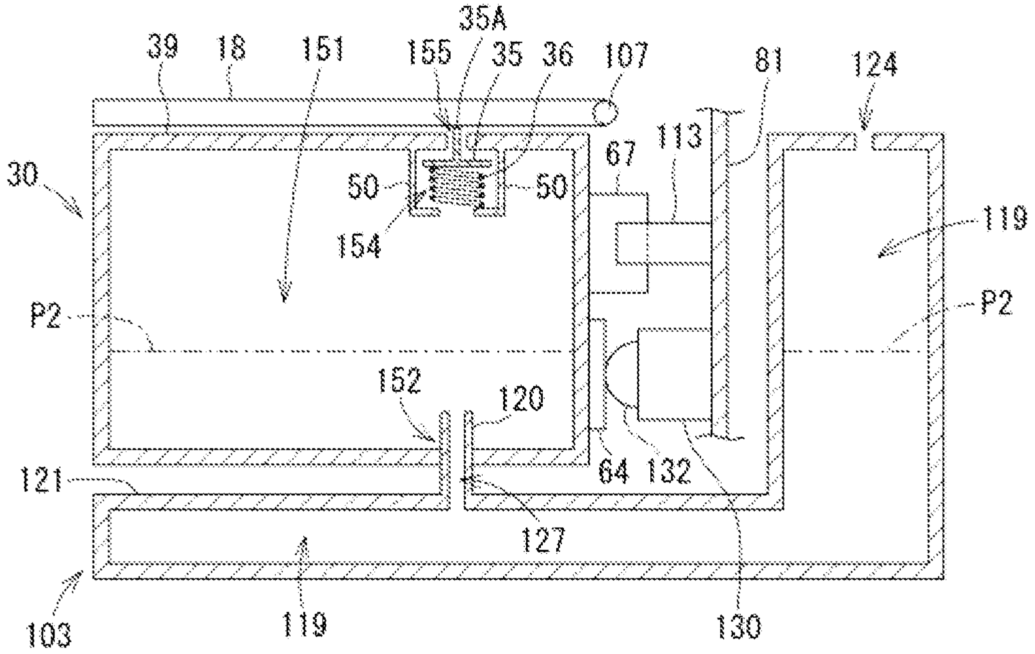
Figure 19B:
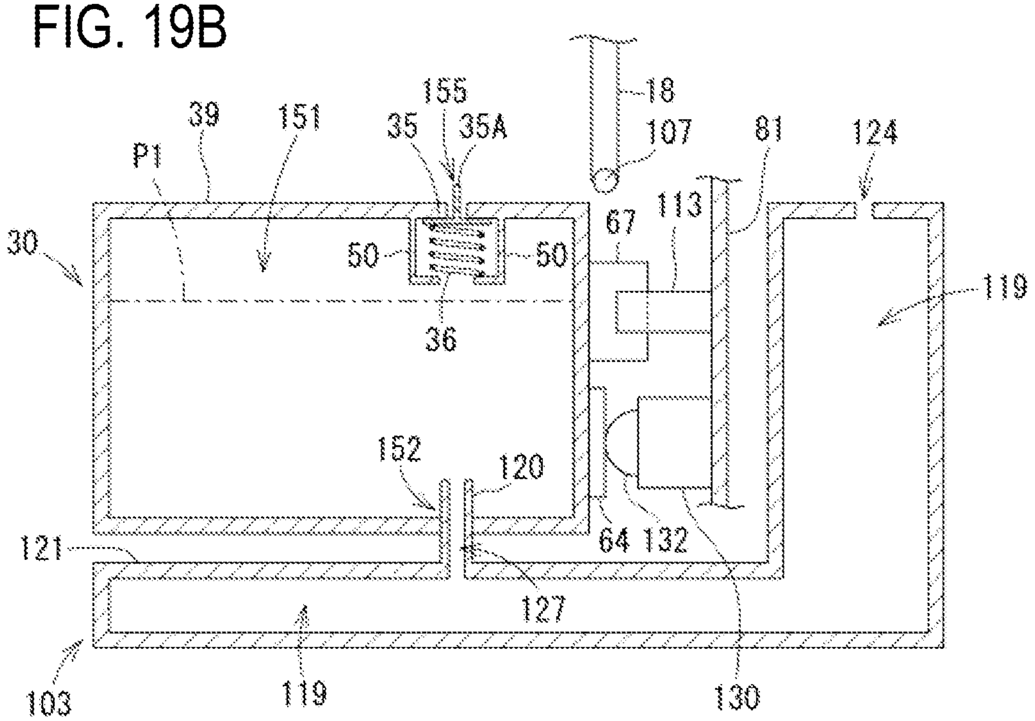

As illustrated in FIGS. 19A and 19B, the tank 103 has an L shape in side view. The tank 103 extends rearward from the back wall 81 of the holder 101, and extends upward behind the back wall 81.

The flow pipe 120 does not include the partition wall 123. That is, the internal space of the flow pipe 120 is formed by only one flow path 127.

An air communication hole 155 that passes through the upper wall 39 is formed in the upper wall 39 of the ink cartridge 30. Thus, the internal space 151 communicates with the atmosphere. The air communication hole 155 is configured to be openable and closable. In the configuration illustrated in FIGS. 19A and 19B, the ink cartridge 30 includes the valve 35 and a coil spring 36 (an example of a urging member). The valve 35 and the coil spring 36 are arranged in a subspace 154 defined by the inner wall 50 of the housing 31. The valve 35 is movable between an opening position (see FIG. 19A) for opening the air communication hole 155 and a closing position (see FIG. 19B) for closing the air communication hole 155. The coil spring 36 urges the valve 35 to the closing position. When the valve 35 is at the closing position, the tip portion 35A of the valve 35 protrudes upward from the upper wall 39 of the housing 31. In addition, the configuration which can open and close the air communication hole 155 is not limited to the configuration provided with the valve 35 and the coil spring 36, and well-known various configurations can be employed.

The ink cartridge 30 is mounted on the holder 101 of the mounting unit 110 in the same manner as in the above embodiment.

After the ink cartridge 30 is mounted on the holder 101, until the cover 18 is rotated from the opening position to the covering position, the valve 35 is urged by the coil spring 36 to be at the closing position, as illustrated in FIG. 19B. That is, the internal space 151 of the ink cartridge 30 is not open to the atmosphere. For this reason, the ink does not flow from the internal space 151 to the internal space 119 of the tank 103 via the flow path 127, and the level of the ink stored in the internal space 151 is maintained at the position P1.

When the cover 18 is rotated from the opening position to the covering position in the mounted state, the tip portion 35A of the valve 35 is brought into contact with the cover 18 from above and pushed downward. Accordingly, as illustrated in FIG. 19A, the valve 35 moves from the closing position to the opening position against the urging force of the coil spring 36. Thus, the internal space 151 of the ink cartridge 30 is opened to the atmosphere. Therefore, the ink flows from the internal space 151 to the internal space 119 via the flow path 127 due to the liquid head difference in the liquid levels in the internal spaces 151 and 119. As a result, the liquid levels of the ink stored in the internal spaces 151 and 119 are the position P2.

Here, the tip portion 35A of the valve 35 is directly above the through-hole 152. In other words, in plan view, at least a part of the tip portion 35A of the valve 35 and the through-hole 152 overlap each other. In other words, in plan view, at least a part of the position where the cover 18 is in contact with the ink cartridge 30, and the through-hole 152 overlap each other. The tip portion 35A of the valve 35 and the through-hole 152 may not overlap in plan view.

In the above-described embodiment (configuration illustrated in FIG. 8), the cover 18 in the covering position may contact the ink cartridge 30 from above. In this case, it is preferable that at least a part of the position where the cover 18 is in contact with the ink cartridge 30, and the through-hole 152 overlap each other in plan view.

According to the modification illustrated in FIGS. 19A and 19B, the ink stored in the ink cartridge 30 can be supplied to the tank 103 without requiring a complicated configuration.

According to the modification illustrated in FIGS. 19A and 19B, when the ink cartridge 30 is not connected to the tank 103, the valve 35 is urged by the coil spring 36 and is in the closing position. Therefore, it is possible to prevent the ink stored in the ink cartridge 30 from leaking outside through the air communication hole 155.

According to the modification illustrated in FIGS. 19A and 19B, when the ink cartridge 30 is connected to the tank 103 and the cover 18 is moved to the covering position, the valve 35 is moved to the opening position. As a result, the ink can be supplied from the ink cartridge 30 to the tank 103 by the water head difference.

According to the modification illustrated in FIGS. 19A and 19B, the position where the cover 18 in the covering position is in contact with the ink cartridge 30, and the through-hole 152 overlap each other in the line of sight along the vertical direction. Therefore, the posture of the ink cartridge 30 connected to the tank 103 can be stabilized.

In the above embodiment, the ink stored in the ink cartridge 30 and the tank 103 is visible through the opening 47 that is an example of the first translucent portion formed in the lower housing 13 and the openings 48 and 49 that are examples of the second translucent portion. However, the means for visually recognizing the ink stored in the ink cartridge 30 and the tank 103 is not limited to the openings 47, 48, and 49 as long as the means has translucency. For example, a transparent plate may be attached to the openings 47, 48, and 49. In this case, since the plate has translucency, the ink stored in the ink cartridge 30 and the tank 103 is visible through the plate. The plate provided on the front wall 44 is an example of the first translucent portion. The plates provided on the right side wall 45 and the left side wall 46 are examples of the second translucent portion.

The multifunction device 10 may not include the cover 18. In this case, in the configuration illustrated in FIGS. 15A and 15B, the upper housing 14 may be in contact with the tip portion 35A of the valve 35. That is, the upper housing 14 functions as a cover instead of the cover 18.

In the above embodiment, the upper housing 14 and the cover 18 are moved to the covering position and the opening position by rotation, but may be moved to the covering position and the opening position by other than rotation (for example, sliding back and forth).

In the above embodiment, the ink cartridge 30 provided with the circuit board 64 and the protrusion 67 is connected to the tank 103, but the reservoir connected to the tank 103 is not limited to the ink cartridge 30. For example, a bottle that does not include the circuit board 64 or the protrusion 67 may be connected to the tank 103 as a reservoir. In this case, the means for flowing the ink stored in the bottle into the tank 103 may be a means by the chicken feed method as described above, a means by a water head difference, or other means (for example, a means for flowing the ink stored in the bottle into the tank 103 by pumping the bottle).

The shape of the reservoir may be a rectangular parallelepiped like the ink cartridge 30 or may be other shapes. For example, the bottle may be configured in a cylindrical shape. The shape of the tank 103 is not limited to a rectangular parallelepiped.

In the above-described embodiment, ink is described as an example of liquid. However, instead of ink, for example, a pretreatment liquid ejected onto the sheet or the like prior to ink at the time of printing may be stored in a liquid cartridge. Further, water for cleaning the recording head 21 may be stored in the liquid cartridge.

(1) According to an aspect of the invention, a system includes:

a housing that includes a conveyance path that extends in a depth direction intersecting a height direction of the housing and through which a sheet passes;

a first tank that is disposed on one side of the conveyance path inside the housing in a width direction perpendicular to the height direction and the depth direction and configured to store liquid;

a second tank that is disposed on the other side of the conveyance path inside the housing in the width direction and configured to store liquid;

a first reservoir that is configured to be connected to the first tank and configured to store liquid;

a second reservoir that is configured to be connected to the second tank and configured to store liquid; and a liquid discharge head that is disposed inside the housing and ejects the liquid supplied from the first tank and the second tank, wherein the housing includes:

a front wall having an opening through which a sheet is discharged;

a rear wall facing the front wall; and a housing side contact, each of the first reservoir and the second reservoir includes:

a liquid flow hole which is configured to lead the stored liquid to the outside;

a first outer wall that has translucency and is visible from the outside of the housing through a translucent portion formed in the front wall and having translucency when the first reservoir is connected to the first tank or the second reservoir is connected to the second tank; and a second outer wall located between the first outer wall and the rear wall when the first reservoir is connected to the first tank or the second reservoir is connected to the second tank, and facing the first outer wall, the first tank includes a first flow pipe that extends upward from an upper end of the first tank and is configured to be connected to the liquid flow hole of the first reservoir, the second tank includes a second flow pipe that extends upward from an upper end of the second tank and is configured to be connected to the liquid flow hole of the second reservoir, and the system further includes a circuit board that is disposed on the second outer wall and has a reservoir side contact that contacts the housing side contact when the first reservoir is connected to the first tank or the second reservoir is connected to the second tank.

The second outer wall is a wall facing the first outer wall. Here, the first outer wall is visible from the outside of the housing through the translucent portion formed in the front wall of the housing when the first reservoir and the second reservoir (hereinafter, the first reservoir and the second reservoir are collectively referred to as a reservoir) are connected to the first tank and the second tank (hereinafter, the first tank and the second tank are collectively referred to as a tank). According to this configuration, the circuit board is disposed on the second outer wall. As a result, it is not necessary to arrange a mechanism such as a housing side contact that is electrically conducted to the circuit board, with a reservoir in the width direction. Therefore, it is possible to suppress an increase in the size of the housing in the width direction due to the arrangement of the circuit board.

Further, according to this configuration, the reservoir is connected to the tank from above the housing. In other words, the liquid flow hole of the reservoir is formed in the wall facing downward in the reservoir. The second outer wall on which the circuit board is disposed is not a wall facing downward in the reservoir. Therefore, when the reservoir is connected to the tank and when the connection is released, the possibility that the liquid stored in the reservoir and the tank adheres to the circuit board can be reduced.

(2) In the system of (1), the liquid flow hole is located closer to the first outer wall than the second outer wall in a direction in which the first outer wall and the second outer wall face each other.

According to this configuration, the distance between the liquid flow hole and the second outer wall can be increased. Therefore, when the reservoir is connected to the tank and when the connection is released, the possibility that the liquid stored in the reservoir and the tank adheres to the circuit board can be reduced.

(3) According to another aspect of the invention, a system includes:

a housing that includes a conveyance path that extends in a depth direction intersecting a height direction of the housing and through which a sheet passes;

a first tank that is disposed on one side of the conveyance path inside the housing in a width direction perpendicular to the height direction and the depth direction and configured to store liquid;

a second tank that is disposed on the other side of the conveyance path inside the housing in the width direction and configured to store liquid;

a first reservoir that is configured to be connected to the first tank and configured to store liquid;

a second reservoir that is configured to be connected to the second tank and configured to store liquid; and a liquid discharge head that is disposed inside the housing and ejects the liquid supplied from the first tank and the second tank, wherein the housing includes:

a front wall having an opening through which a sheet is discharged;

a rear wall facing the front wall; and a housing side contact, each of the first reservoir and the second reservoir includes:

a liquid flow hole which is configured to lead the stored liquid to the outside, a first outer wall that has translucency and is visible from the outside of the housing through a translucent portion formed in the front wall and having translucency when the first reservoir is connected to the first tank or the second reservoir is connected to the second tank;

a second outer wall located between the first outer wall and the rear wall when the first reservoir is connected to the first tank or the second reservoir is connected to the second tank, and facing the first outer wall; and a lower outer wall connecting lower end portions of the first outer wall and the second outer wall, the first tank includes a first flow pipe that extends upward from an upper end of the first tank and is configured to be connected to the liquid flow hole of the first reservoir, the second tank includes a second flow pipe that extends upward from an upper end of the second tank and is configured to be connected to the liquid flow hole of the second reservoir, and the system further includes a circuit board that is disposed on the lower outer wall and has a reservoir side contact that contacts the housing side contact when the first reservoir is connected to the first tank, or when the second reservoir is connected to the second tank.

The lower outer wall is a wall facing downward when the reservoir is connected to the tank. According to this configuration, the circuit board is disposed on the lower outer wall. As a result, it is not necessary to arrange a mechanism such as a housing side contact that is conducted to the circuit board, with a reservoir in the width direction. Therefore, it is possible to suppress an increase in the size of the housing in the width direction due to the arrangement of the circuit board.

(4) The system of (3) further includes:

an absorber that absorbs liquid and is disposed between the first flow pipe and the circuit board in a state where the first reservoir is connected to the first tank, or between the second flow pipe and the circuit board in a state where the second reservoir is connected to the second tank.

According to this configuration, when the liquid stored in the reservoir and the tank flows toward the circuit board, the liquid is absorbed by the absorber. Accordingly, the adhesion of the liquid to the circuit board can be reduced.

(5) According to another aspect of the invention, a system includes:

a housing that includes a conveyance path that extends in a depth direction intersecting a height direction of the housing and through which a sheet passes;

a first tank that is disposed on one side of the conveyance path inside the housing in a width direction perpendicular to the height direction and the depth direction and configured to store liquid;

a second tank that is disposed on the other side of the conveyance path inside the housing in the width direction and configured to store liquid;

a first reservoir that is configured to be connected to the first tank and configured to store liquid;

a second reservoir that is configured to be connected to the second tank and configured to store liquid; and a liquid discharge head that is disposed inside the housing and ejects the liquid supplied from the first tank and the second tank, wherein the housing includes:

a front wall having an opening through which a sheet is discharged;

a rear wall facing the front wall; and a housing side contact, each of the first reservoir and the second reservoir includes:

a liquid flow hole which is configured to lead the stored liquid to the outside;

a first outer wall that has translucency and is visible from the outside of the housing through a translucent portion formed in the front wall and having translucency when the first reservoir is connected to the first tank or the second reservoir is connected to the second tank;

a second outer wall located between the first outer wall and the rear wall when the first reservoir is connected to the first tank or the second reservoir is connected to the second tank, and facing the first outer wall; and an upper outer wall connecting upper end portions of the first outer wall and the second outer wall, the first tank includes a first flow pipe that extends upward from an upper end of the first tank and is configured to be connected to the liquid flow hole of the first reservoir, the second tank includes a second flow pipe that extends upward from an upper end of the second tank and is configured to be connected to the liquid flow hole of the second reservoir, and the system further includes a circuit board that is disposed on the upper outer wall and has a reservoir side contact that contacts the housing side contact when the first reservoir is connected to the first tank, or when the second reservoir is connected to the second tank.

The upper outer wall is a wall facing upward when the reservoir is connected to the tank. According to this configuration, the circuit board is disposed on the upper outer wall. As a result, it is not necessary to arrange a mechanism such as a housing side contact that is electrically conducted to the circuit board, with a reservoir in the width direction. Therefore, it is possible to suppress an increase in the size of the housing in the width direction due to the arrangement of the circuit board.

Further, according to this configuration, the reservoir is connected to the tank from above the housing. In other words, the liquid flow hole of the reservoir is formed in the wall facing downward in the reservoir. Thus, the upper outer wall on which the circuit board is disposed is not a wall facing downward in the reservoir. Therefore, when the reservoir is connected to the tank and when the connection is released, the possibility that the liquid stored in the reservoir and the tank adheres to the circuit board can be reduced.

(6) In the system of (5), the housing includes a cover that is movable to a covering position that covers upper ends of the first reservoir connected to the first tank and the second reservoir connected to the second tank, and to an opening position that opens the upper ends, the housing side contact is disposed on the cover, and when the cover is in the covering position, the housing side contact comes into contact with the reservoir side contact.

According to this configuration, it is possible to detect that the reservoir is connected to the tank and that the cover has moved to the covering position, by detecting the contact between the housing side contact and the reservoir side contact. That is, it is not necessary to separately provide a sensor for detecting that the reservoir is connected to the tank and a sensor for detecting that the cover has moved to the covering position.

(7) In the system of (3), the liquid flow hole is located closer to the first outer wall than the second outer wall in the facing direction in which the first outer wall and the second outer wall face each other, and the circuit board is located closer to the second outer wall than the first outer wall in the facing direction.

According to this configuration, the distance between the liquid flow hole and the circuit board in the facing direction can be increased. Therefore, when the reservoir is connected to the tank and when the connection is released, the possibility that the liquid stored in the reservoir and the tank adheres to the circuit board can be reduced.

(8) In the system of (1), the liquid flow hole of the first reservoir is on one side with respect to the center of the first reservoir in the width direction, and the circuit board disposed in the first reservoir is disposed on the other side with respect to the center of the first reservoir in the width direction.

(9) In the system of (1), the liquid flow hole of the second reservoir is on one side with respect to the center of the second reservoir in the width direction, and the circuit board disposed in the second reservoir is disposed on the other side with respect to the center of the second reservoir in the width direction.

According to these configurations, the distance between the liquid flow hole and the circuit board in the width direction can be increased. Therefore, when the reservoir is connected to the tank and when the connection is released, the possibility that the liquid stored in the reservoir and the tank adheres to the circuit board can be reduced.

(10) In the system of (1), each of the first tank and the second tank includes a first wall having translucency, and the first wall is visible from the outside of the housing through the translucent portion.

According to this configuration, the remaining amount of the liquid stored in the tank can be confirmed from the front.

(11) In the system of (1), each of the first reservoir and the second reservoir includes a third outer wall that has translucency and connects one end of the first outer wall in the width direction and one end of the second outer wall in the width direction, the housing includes a side wall that connects one end of the front wall in the width direction and one end of the rear wall in the width direction, and the third outer wall is visible from the outside of the housing through a second translucent portion that is formed in the side wall and has translucency.

According to this configuration, the remaining amount of the liquid stored in the reservoir can be confirmed not only from the front but also from the side.

(12) In the system of (11), each of the first tank and the second tank include a second wall having translucency, and the second wall is visible from the outside of the housing through the second translucent portion.

According to this configuration, the remaining amount of the liquid stored in the tank can be confirmed not only from the front but also from the side.

(13) According to another aspect of the invention, a system includes:

- a housing that includes a conveyance path that extends in a depth direction intersecting a height direction of the housing and through which a sheet passes;
- a first tank that is disposed on one side of the conveyance path inside the housing in a width direction perpendicular to the height direction and the depth direction and configured to store liquid;
- a second tank that is disposed on the other side of the conveyance path inside the housing in the width direction and configured to store liquid;
- a first reservoir that is configured to be connected to the first tank and configured to store liquid;
- a second reservoir that is configured to be connected to the second tank and configured to store liquid; and
- a liquid discharge head that is disposed inside the housing and ejects the liquid supplied from the first tank and the second tank, wherein
- each of the first reservoir and the second reservoir includes a liquid flow hole through which the stored liquid is flowable to the outside the reservoir,
- the first tank includes a first flow pipe that extends upward from an upper end of the first tank and is configured to be connected to the liquid flow hole of the first reservoir, and
- the second tank includes a second flow pipe that extends upward from an upper end of the second tank and is configured to be connected to the liquid flow hole of the second reservoir.

According to this configuration, the first tank and the second tank (hereinafter, the first tank and the second tank are collectively referred to as a tank) are arranged separately in one side and the other side of the conveyance path in the width direction. Therefore, the size of each tank can be enlarged compared with the configuration in which all the tanks are arranged only on one side of the conveyance path in the width direction.

Further, according to this configuration, the reservoir is connected to the tank from above. Therefore, it is possible to reduce the possibility that the reservoir will accidentally come out of the tank, compared to the configuration in which the reservoir is connected to the tank along the horizontal direction.

(14) In the system of (13), at least one of the first tank or the second tank includes a first wall having translucency, the housing includes a front wall having an opening through which a sheet is discharged, and the first wall is visible from the outside of the housing through a first translucent portion formed in the front wall and having translucency.

Usually, the user of the system takes out the discharged sheet while facing the front wall of the housing. That is, the sheet discharged from the front of the housing is taken out. According to this configuration, it is possible to check the remaining amount of the liquid stored in the tank through the first wall from the front of the housing.

(15) In the system of (14), the first reservoir includes a second wall having translucency, and when the first reservoir is connected to the first tank, the second wall is visible from the outside of the housing through the first translucent portion.

(16) In the system of (14), the second reservoir includes a third wall having translucency, and when the second reservoir is connected to the second tank, the third wall is visible from the outside of the housing through the first translucent portion.

Usually, the user of the system takes out the discharged sheet while facing the front wall of the housing. That is, the sheet discharged from the front of the housing is taken out. According to the configurations of (3) and (4), the remaining amount of the liquid stored in the reservoir can be confirmed from the front of the housing through the second wall and the third wall.

(17) In the system of (14), the housing includes a side wall extending from an end portion of the front wall in the width direction along a direction intersecting the width direction and the height direction, and the first wall is visible from the outside of the housing through a second translucent portion formed in the side wall and having translucency.

According to this configuration, the remaining amount of the liquid stored in the tank can be confirmed through the first wall from the side in addition to the front.

(18) In the system of (17), the first reservoir includes a second wall having translucency, and when the first reservoir is connected to the first tank, the second wall is visible from the outside of the housing through the second translucent portion.

(19) In the system of (17), the second reservoir includes a third wall having translucency, and when the second reservoir is connected to the second tank, the third wall is visible from the outside of the housing through the second translucent portion.

According to this configuration, the remaining amount of the liquid stored in the reservoir can be confirmed through the second wall and the third wall from the side in addition to the front.

(20) In the system of (13), the system includes at least either of the first tank and the second tank in plural, and at least either of the plurality of first tanks or the plurality of second tanks is arranged in parallel along the width direction.

According to this configuration, the tanks arranged in parallel along the width direction can be easily configured to be visible from the front.

(21) In the system of (13), the system includes at least either of the first reservoir and the second reservoir in plural, and at least either of the plurality of first reservoirs or the plurality of second reservoirs is arranged in parallel along the width direction.

According to this configuration, the reservoirs arranged in parallel along the width direction can be easily configured to be visible from the front.

(22) In the system of (13), the system includes at least either of the first tank or the second tank in plural, and at least either of the plurality of first tanks or the plurality of second tanks is arranged in parallel along the depth direction.

According to this configuration, the tanks arranged in parallel along the depth direction can be easily configured to be visible from the side.

(23) In the system of (13), the system includes at least either of the first reservoir or the second reservoir in plural, and at least either of the plurality of first reservoirs or the plurality of second reservoirs is arranged in parallel along the depth direction.

According to this configuration, the reservoirs arranged in parallel along the depth direction can be easily configured to be visible from the side.

(24) In the system of (13), a liquid having a first specific gravity is stored in the first tank and the first reservoir, and a liquid having a second specific gravity smaller than the first specific gravity is stored in the second tank and the second reservoir.

According to this configuration, for example, a mechanism necessary only for the liquid having the first specific gravity (for example, a pigment stirring mechanism that is necessary when the liquid having the first specific gravity is a pigment) may be disposed only near the first tank. That is, the mechanism does not need to be disposed near the second tank. Therefore, the second tank can be enlarged.

(25) In the system of (13), the first tank and the second tank include an air communication hole that allows the internal space of the first tank and the second tank to communicate with the atmosphere, a first flow path in which one end thereof is below the air communication hole in the internal space, and the other end thereof is opened to the outside through the first flow pipe or the second flow pipe, and a second flow path in which one end thereof is below the one end of the first flow path in the internal space, and the other end thereof is opened to the outside through the first flow pipe or the second flow pipe.

According to this configuration, in the state where the reservoir is connected to the tank, when the liquid stored in the tank is consumed and the liquid level is lower than the opening at the lower end of the first flow path, the air enters the tank from the air communication hole and enters the reservoir through the first flow path. Then, the liquid corresponding to the volume of the air that has entered the reservoir is supplied from the reservoir into the tank through the second flow path. When the liquid level in the tank reaches the opening of the first flow path, the liquid supply is stopped. Accordingly, the liquid level of the liquid stored in the tank can be kept constant.

(26) In the system of (13), each of the first tank, the second tank, the first reservoir, and the second reservoir is provided with a air communication hole that allow the internal space thereof to communicate with the atmosphere, when the first reservoir is connected to the first tank, the liquid flows between the first reservoir and the first tank due to a water head difference between the liquid level of the liquid stored in the first reservoir and the liquid level of the liquid stored in the first tank, and when the second reservoir is connected to the second tank, the liquid flows between the second reservoir and the second tank due to a water head difference between the liquid level of the liquid stored in the second reservoir and the liquid level of the liquid stored in the second tank.

According to this configuration, the liquid stored in the reservoir can be supplied to the tank without requiring a complicated configuration.

(27) The system of (26) further includes:

a cover that is movable to a covering position for covering upper ends of the first reservoir connected to the first tank and the second reservoir connected to the second tank, and to an opening position for opening the upper ends, wherein the first reservoir and the second reservoir include a valve that is movable to a closing position for closing the air communication hole of the first reservoir and the second reservoir, and to an opening position for opening the air communication hole of the first reservoir and the second reservoir, and a urging member that is configured to urging the valve to the closing position, and the valve moves to the opening position against the urging force of the urging member by contacting the cover in the covering position.

According to this configuration, when the reservoir is not connected to the tank, the valve is urged by the urging member and is in the closing position. Therefore, the liquid stored in the reservoir can be prevented from leaking outside through the air communication hole of the reservoir.

Further, according to this configuration, when the reservoir is connected to the tank and the cover is moved to the covering position, the valve moves to the opening position.

As a result, the liquid can be supplied from the reservoir to the tank by the water head difference.

28. The system according to claim 13, further comprising:

a cover that is movable to a covering position for covering the upper ends of the first reservoir connected to the first tank and the second reservoir connected to the second tank, and to an opening position for opening the upper ends.

According to this configuration, the reservoir connected to the tank can be protected by the cover.

(29) In the system of (16), the cover in the covering position is in contact with the first reservoir from above, and the position where the cover in the covering position is in contact with the first reservoir, and the liquid flow hole of the first reservoir overlap each other in the line of sight along the height direction.

(30) In the system of (16), the cover in the covering position is in contact with the second reservoir from above, and the position where the cover in the covering position is in contact with the second reservoir, and the liquid flow hole of the second reservoir overlap each other in the line of sight along the height direction.

According to the configurations of (29) and (30), the position where the cover in the covering position is in contact with the reservoir, and the liquid flow hole overlap each other in the line of sight along the vertical direction. Therefore, the posture of the reservoir connected to the tank can be stabilized.

(31) The system of (13) further includes a first holding mechanism that holds the first reservoir in a state of being connected to the first tank.

(32) The system of (13) further includes a second holding mechanism that holds the second reservoir in a state of being connected to the second tank.

According to this configuration, it is possible to prevent the reservoir from being unintentionally detached from the tank.

According to the present invention, it is possible to suppress an increase in the size of the housing and to reduce the possibility of adhesion of liquid to the circuit board.

According to the present invention, it is possible to enlarge the tank, and to reduce the possibility that the reservoir connected to the tank will accidentally come out of the tank.

What is claimed is:

1. A system comprising:

a reservoir configured to store liquid;

a tank including a flow pipe configured to connect to the reservoir;

a housing that includes a conveyance path that extends in a depth direction intersecting a height direction of the housing and through which a sheet passes;

a liquid discharge head that is disposed inside the housing and configured to eject the liquid supplied from the tank; and a holder that is disposed on one side of the conveyance path inside the housing in a width direction perpendicular to the height direction and the depth direction and has an opening disposed at an upper end of the holder such that the reservoir is configured to be mounted into the holder through the opening to connect to the flow pipe of the tank;

wherein the holder includes a front wall that defines a front end of the holder in the depth direction and that has a front opening configured to face the reservoir in a state where the reservoir is mounted into the holder.

2. The system according to claim 1, wherein the reservoir has a translucency area that allows the liquid stored in the reservoir to be visually recognized from the outside of the reservoir, and the translucency area of the reservoir faces the front opening in a state where the reservoir is mounted into the holder.

3. The system according to claim 2, wherein a dimension of the front opening of the front wall of the holder in the width direction is greater than a dimension of the translucency area of the reservoir in the width direction.

4. The system according to claim 1, wherein the flow pipe includes:

a liquid flow path configured be supplied with the liquid from the reservoir; and an air flow path configured to supply the air to the reservoir.

5. The system according to claim 4, wherein the liquid flow path and the air flow path are arranged along the depth direction and configured to be connected to the reservoir.

6. The system according to claim 5, wherein the flow pipe includes a partition extending upward between the liquid flow path and the air flow path in the depth direction.

7. The system according to claim 4, wherein the reservoir includes:

a through-hole configured to receive the liquid flow path and the air flow path; and a valve movable between a closed position at which the through-hole is closed and an opened position at which the through-hole is open.

8. The system according to claim 1, wherein the holder is configured to receive a plurality of reservoirs including the reservoir, the plurality of reservoirs is arranged along the width direction in the holder in a state where the plurality of reservoirs is mounted to the holder.

9. The system according to claim 1 further comprising:

a cover that is movable to a covering position for covering the upper end of the reservoir in a state where the reservoir is mounted to the holder, and to an open position for opening the upper end of the reservoir.

10. The system according to claim 1 further comprising:

another reservoir configured to store liquid;

another holder that is disposed on the other side of the conveyance path inside the housing in the width direction and has another opening at an upper end of the another holder to mount the another reservoir through the another opening; and another flow pipe configured to enter the another reservoir, positioned in the another holder and extending in the height direction, an upper end of the another flow pipe in the height direction facing the another opening of the another holder, wherein the another holder includes another front wall that defines a front end of the another holder in the depth direction, the another front wall having another front opening configured to face the another reservoir in a state where the another reservoir is mounted to the another holder.

11. The system according to claim 10, wherein a dimension of the another holder in the width direction is greater than a dimension of the holder in the width direction.

12. The system according to claim 10, wherein the another flow pipe includes:

another liquid flow path configured to be supplied with the liquid from the another reservoir; and another air flow path configured to supply the air to the another reservoir.

13. The system according to claim 12, wherein the another liquid flow path and the another air flow path are arranged along the depth direction and configured to be connected to the another reservoir.

14. The system according to claim 13, wherein the another flow pipe includes a partition extending upward between the another liquid flow path and the another air flow path in the depth direction.

15. The system according to claim 12, wherein the another reservoir includes:

a through-hole configured to receive the another liquid flow path and the another air flow path; and a valve movable between a closed position at which the through-hole is closed and an opened position at which the through-hole is open.

16. The system according to claim 10 further comprising a cover that is movable to a covering position for covering the upper end of the another reservoir in a state where the another reservoir is mounted to the another holder, and to an open position for opening the upper end of the another reservoir.

* * * * *